United States Patent
Shrivastav et al.

(10) Patent No.: US 12,131,456 B2
(45) Date of Patent: Oct. 29, 2024

(54) METHOD AND SYSTEM FOR IDENTIFICATION AND CLASSIFICATION OF DIFFERENT GRAIN AND ADULTERANT TYPES

(71) Applicant: Tata Consultancy Services Limited, Mumbai (IN)

(72) Inventors: Rajatkumar Shrivastav, Thane (IN); Swagatam Bose Choudhury, Thane (IN); Sanat Sarangi, Thane (IN); Karthik Srinivasan, Chennai (IN); Vaibhav Sadashiv Lonkar, Pune (IN); Nagameena Neelakantapillai, Chennai (IN); Dinesh Kumar Singh, Thane (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 359 days.

(21) Appl. No.: 17/661,895

(22) Filed: May 3, 2022

(65) Prior Publication Data
US 2023/0069639 A1    Mar. 2, 2023

(30) Foreign Application Priority Data
Jul. 26, 2021   (IN) .............................. 202121033558

(51) Int. Cl.
*G06T 7/00*   (2017.01)
*G06T 5/70*   (2024.01)
*G06T 7/11*   (2017.01)
*G06V 20/68*   (2022.01)

(52) U.S. Cl.
CPC ............. *G06T 7/0004* (2013.01); *G06T 5/70* (2024.01); *G06T 7/11* (2017.01); *G06V 20/68* (2022.01);
(Continued)

(58) Field of Classification Search
None
See application file for complete search history.

(56) References Cited

U.S. PATENT DOCUMENTS

| | | | |
|---|---|---|---|
| 2018/0315135 A1* | 11/2018 | Sarangi | G06Q 10/06316 |
| 2020/0027204 A1* | 1/2020 | Hadar | A01D 41/1278 |
| 2021/0090239 A1* | 3/2021 | Pattnaik | G06T 7/174 |

OTHER PUBLICATIONS

Rajlakshmi Ghatkamble, "Grading and Classification of Rice Grain Using PNN Technique in Digital Image Processing," Grading and Classification of Rice Grain Using PNN Technique in Digital Image Processing, Nov. 2018, Research Gate, https://www.researchgate.net/publication/329059092_Grading_and_Classification_of_Rice_Grain_Using_PNN_Technique_in_Digital_Image_Processing/link/5bf3c4c09851c6b27cc259a/download.

(Continued)

*Primary Examiner* — Haris Sabah
(74) *Attorney, Agent, or Firm* — Finnegan, Henderson, Farabow, Garrett & Dunner, L.L.P.

(57) ABSTRACT

State of art techniques mostly rely of computationally intensive, time consuming Neural Networks. Embodiments provide a method and system for identification and classification of different grain and adulterant types for grain grading analysis. The method analyzes input image of grain sample of elements to determine morphological features of elements, using dynamically determined calibration factor from reference object in the image. Variation in perimeter of elements is used to perform classification of elements into target grain size, low size adulterants and higher size adulterants. The aspect ratio of target grain determines grain variety and adulterants determine adulteration percentage. Elements are classified into grain colored and non-grain colored adulterants. Grain colored adulterants are further classified as Grain Like Impurities and non-GLI, using predefined ranges of standard deviation of perimeter metric.

(Continued)

Weight of grain colored adulterants and non-grain colored adulterant is obtained using mapping of predefined weights to the aspect ratio.

12 Claims, 21 Drawing Sheets

(52) U.S. Cl.
CPC .............. *G06T 2207/10024* (2013.01); *G06T 2207/30128* (2013.01)

(56) References Cited

OTHER PUBLICATIONS

Priyankaran Tanck et al., "Adulteration Detection in Basmati Rice When Mixed With Low Premium Rice Brand," ,Remote Sensing, Nov. 2015, Digital Xplore, http:/www.digitalxplore.org/up_proc/pdf/57-139634768353-56.pdf.

Sanjivani Shantaiya et al., "Identification of Food Grains and Its Quality Using Pattern Classification," Computer Science, 2010, vol. 3, Issue: 1, Semantic Scholar, https://www.interscience.in/cgi/viewcontent.cgi?article=1107&context=ijcct#:~text=In%20the%20present%20grain%2Dhandling.however%2C%20tedious%20and%20time%20consuming &text=(1986)%20suggested%20some%20pattern%20recognition.identifying%20and%20classifying%20cereal%20grains.

Basavaraj S. Anami et al. "Automated recognition and classification of adulteration levels from bulk paddy grain samples," Information Processing in Agriculture, Mar. 2019, vol. 6, Issue: 1, pp. 47-60, Science Direct, https://www.sciencedirect.com/sdfe/reader/pii/S2214317318300441/pdf.

* cited by examiner

200

```
┌─────────────────────────────────────────────┐
│ preprocessing an image, received for the     │
│ grain grading analysis for a grain type, to  │
│ enhance image quality, wherein the image     │
│ comprises a sample element mixture           │──202
│ comprising a plurality of elements and a     │
│ reference object, and wherein preprocessing  │
│ comprises iterating the image through an     │
│ image enhancement process till the image     │
│ satisfies a quality criteria                 │
└─────────────────────────────────────────────┘
                      ↓
┌─────────────────────────────────────────────┐
│ processing the preprocessed image by         │
│ performing resizing, denoising, inpainting   │──204
│ and Gaussian blurring to obtain a            │
│ processed image                              │
└─────────────────────────────────────────────┘
                      ↓
┌─────────────────────────────────────────────┐
│ determining a plurality of morphological     │
│ features of the plurality of elements in the │
│ processed image by:                          │
│ a)    performing background elimination      │
│ using image segmentation and by inpainting   │
│ operation followed by contour detection on   │
│ the preprocessed image to obtain a contour   │
│ plot of each of the plurality of elements    │
│ and the reference object in the processed    │
│ image with background elimination;           │
│ b)    determining a calibration factor in    │──206
│ terms of pixel per metric for a length, a    │
│ width and a height, and a multiplicative     │
│ weight factor for each aspect ratio using    │
│ prior known dimensions and a plurality of    │
│ grain types to generate aspect ratio to      │
│ predetermined weight tables; and             │
│ c)    determining the plurality of           │
│ morphological features of each of the        │
│ plurality of elements using the contour plot │
│ and the calibration factor, wherein the      │
│ morphological features comprises a           │
│ perimeter, a width, a height, and an aspect  │
│ ratio                                        │
└─────────────────────────────────────────────┘
                      ↓
                     (A)
```

208 — confirming whether the sample mixture is of the grain type by determining whether at least a predefined number of elements among the plurality of elements belong to the grain type, wherein the grain type is identified by binning each of the plurality of elements in accordance with the element aspect ratio into a plurality of bins and checking whether one or more elements associated with a bin, among the plurality of bins, satisfy a kernel aspect ratio range predefined for the grain type

↓

210 — differentiating the plurality of elements, post confirming the sample element mixture based on a lower threshold and an upper threshold of an Inter Quartile Range (IQR) of a perimeter metric corresponding to the perimeter of each of the plurality of elements to segregate the plurality of elements as: a) a first set of elements having lower size impurity, in the sample element mixture, b) a second set of elements having a target grain perimeter range, and c) a third set of elements having a higher size impurity

↓

212 — performing:
a) identification of a variety of the grain type, from among the plurality of varieties by binning the second set of elements into a plurality of bins based on the aspect ratio, wherein the aspect ratio associated with a max bin among the plurality of bins that has maximum number of elements from the second set of elements indicates the variety of the grain type being graded in accordance with a predefined aspect ratio to variety mapping; and
b) calculation of a total adulteration percentage for the variety based on number of elements in the max bin and number of elements in the first set of elements and the second set of elements

FIG. 2B

| Component_Num | Width | Height | Area | Perimeter | Aspect_ratio | Aspect_Ratio_Inverse |
|---|---|---|---|---|---|---|
| 1 | 2.24 | 7.27 | 329.5 | 17.83 | 0.308 | 3.25 |
| 2 | 2.70 | 2.21 | 123.0 | 7.89 | 1.222 | 0.82 |
| 3 | 2.28 | 2.16 | 110.5 | 7.62 | 1.056 | 0.95 |
| 4 | 7.99 | 7.14 | 1176.5 | 23.61 | 1.119 | 0.89 |
| 21 | 25.00 | 25.00 | 133318.5 | 78.56 | 1.000 | 1.00 |

```
count    35.000000
mean     16.921143
std      11.531174
min       7.620000
25%      13.305000
50%      15.540000
75%      17.230000
max      78.560000
Name: Perimeter, dtype: float64
```

PTR- Target Rice, LI – Lower size impurity, HI – Higher size impurity

```
count    22.000000
mean      0.327364
std       0.097614
min       0.190000
25%       0.245750
50%       0.306500
75%       0.421750
max       0.492000
Name: Aspect_Ratio, dtype: float64
```

```
count    22.000000
mean      0.327364
std       0.097614
min       0.190000
25%       0.245750
50%       0.306500
75%       0.421750
max       0.492000
Name: Aspect_Ratio, dtype: float64
```

METHOD AND SYSTEM FOR IDENTIFICATION AND CLASSIFICATION OF DIFFERENT GRAIN AND ADULTERANT TYPES

PRIORITY CLAIM

This U.S. patent application claims priority under 35 U.S.C. § 119 to: Indian Patent Application No. 202121033558, filed on 26 Jul. 2021. The entire contents of the aforementioned application are incorporated herein by reference.

TECHNICAL FIELD

The embodiments herein generally relate to image analysis of grain samples and, more particularly, to a method and system for identification and classification of different grain and adulterant types for grain grading analysis.

BACKGROUND

Digitization has penetrated into the agricultural domain, wherein myriad of digital applications assist traditional processes and also often bring in complete automation in certain agricultural or agro-based systems. Grain grading is one of the critical and challenging task in the agro-domain as it requires expertise. Grain grading analysis refers determining grain variety, various types of adulterants and their levels to predict the quality of grain. Naturally, this work predominantly requires manual intervention. However, effectiveness of such manual grain grading system depends largely on an inspector's ability to sample, inspect, certify, and grade the various grains for which standards have been established. Traditional quality evaluation and assessment done by human inspector is prone to recency and confirmation bias errors, higher rate of error in detecting the correct grade and quality of grain under observation. Further, with manual efforts required the process is a time consuming affair. Automation in grading analysis system has been attempted to eliminate the human effort and effectively the human bias. However, current automated grain grading analysis techniques require high end infrastructure, which makes it very expensive requiring very high initial cost, hence uneconomical. This effectively reduces their applicability at ground levels of agro-based applications, affecting usability.

Further, most existing automated grain grading analysis techniques rely on computationally intensive processing such as Convolutional Neural Networks, Principal Component Analysis (PCA) and the like, which are used to analyze input grain images. These modules increase computational complexity and effectively the cost of existing automated systems. Moreover, accuracy of Neural Network (NN) based approaches largely depends on the training dataset, which used for NN model building, which is further a time consuming task. Further, as quality of input test image in practical scenarios cannot be controlled, calibration of existing systems is a concern Furthermore, most existing approaches limit the grain grading analysis to determining adulterants. However, further analysis of the adulterants to give more insights into type of adulteration and proportion of adulteration is challenging considering variation in types of adulterations present and is hardly attempted.

SUMMARY

Embodiments of the present disclosure present technological improvements as solutions to one or more of the above-mentioned technical problems recognized by the inventors in conventional systems.

For example, in one embodiment, a method for identification and classification of different grain and adulterant types during grain grading analysis is provided.

The method includes preprocessing an image, received for the grain grading analysis for a grain type, to enhance image quality, wherein the image comprises a sample element mixture comprising a plurality of elements and a reference object, and wherein the preprocessing comprises iterating the image through an image enhancement process till the image satisfies a quality criteria.

Further includes processing the preprocessed image by performing resizing, denoising, and Gaussian blurring to obtain a processed image.

Further includes determine a plurality of morphological features of the plurality of elements in the processed image by: performing background elimination using image segmentation and inpainting operation, followed by contour detection on the processed image to obtain a contour plot of each of the plurality of elements and the reference object in the processed image. Then determining i) a calibration factor in terms of pixel per metric for a length, a width and a height, and ii) an aspect ratio to predetermined weight mapping tables of a plurality of reference objects, a plurality of grain types and a plurality of varieties of the plurality of grain types. Thereafter determining the plurality of morphological features of each of the plurality of elements using the contour plot and the calibration factor, wherein the morphological features comprise a perimeter, a width, a height, and an aspect ratio.

Further includes confirming whether the sample mixture is of the grain type by determining whether at least a predefined number of elements among the plurality of elements belong to the grain type, wherein the grain type is identified by binning each of the plurality of elements in accordance with the element aspect ratio into a plurality of bins and checking whether one or more elements associated with a bin, among the plurality of bins, satisfy a kernel aspect ratio range predefined for the grain type.

Further includes differentiating the plurality of elements, post confirming the sample element mixture is of the grain type, wherein the differentiation is based on a lower threshold and an upper threshold of an Inter Quartile Range (IQR) of a perimeter metric corresponding to the perimeter of each of the plurality of elements to segregate the plurality of elements as: a first set of elements having lower size impurity in the sample element mixture, a second set of elements having a target grain perimeter range identified for the grain type, and a third set of elements having a higher size impurity.

Furthermore, includes performing identification of a variety of the grain type, from among the plurality of varieties by binning the second set of elements into a plurality of bins based on the aspect ratio, wherein the aspect ratio associated with a max bin among the plurality of bins that has maximum number of elements from the second set of elements indicates the variety of the grain type being graded in accordance with a predefined aspect ratio to variety mapping. Thereafter calculation of a total adulteration percentage for the variety based on number of elements in the max bin and number of elements in the first set of elements and the second set of elements.

In another aspect, a system for identification and classification of different grain and adulterant types during grain grading analysis is provided. The system comprises a memory storing instructions; one or more Input/Output (I/O)

interfaces; and one or more hardware processors coupled to the memory via the one or more I/O interfaces, wherein the one or more hardware processors are configured by the instructions to preprocess an image, received for the grain grading analysis for a grain type, to enhance image quality, wherein the image comprises a sample element mixture comprising a plurality of elements and a reference object, and wherein the preprocessing comprises iterating the image through an image enhancement process till the image satisfies a quality criteria.

Further process the preprocessed image by performing resizing, denoising, and Gaussian blurring to obtain a processed image.

Further determine a plurality of morphological features of the plurality of elements in the processed image by performing background elimination using image segmentation and inpainting operation, followed by contour detection on the processed image to obtain a contour plot of each of the plurality of elements and the reference object in the processed image. Then determining i) a calibration factor in terms of pixel per metric for a length, a width and a height, and ii) an aspect ratio to predetermined weight mapping tables of a plurality of reference objects, a plurality of grain types and a plurality of varieties of the plurality of grain types. Thereafter determining the plurality of morphological features of each of the plurality of elements using the contour plot and the calibration factor, wherein the morphological features comprise a perimeter, a width, a height, and an aspect ratio.

Further confirm whether the sample mixture is of the grain type by determining whether at least a predefined number of elements among the plurality of elements belong to the grain type, wherein the grain type is identified by binning each of the plurality of elements in accordance with the element aspect ratio into a plurality of bins and checking whether one or more elements associated with a bin, among the plurality of bins, satisfy a kernel aspect ratio range predefined for the grain type.

Further, differentiate the plurality of elements, post confirming the sample element mixture is of the grain type, wherein the differentiation is based on a lower threshold and an upper threshold of an Inter Quartile Range (IQR) of a perimeter metric corresponding to the perimeter of each of the plurality of elements to segregate the plurality of elements as: a first set of elements having lower size impurity in the sample element mixture, a second set of elements having a target grain perimeter range identified for the grain type, and a third set of elements having a higher size impurity.

Furthermore, perform identification of a variety of the grain type, from among the plurality of varieties by binning the second set of elements into a plurality of bins based on the aspect ratio, wherein the aspect ratio associated with a max bin among the plurality of bins that has maximum number of elements from the second set of elements indicates the variety of the grain type being graded in accordance with a predefined aspect ratio to variety mapping. Thereafter calculation of a total adulteration percentage for the variety based on number of elements in the max bin and number of elements in the first set of elements and the second set of elements.

In yet another aspect, there are provided one or more non-transitory machine-readable information storage mediums comprising one or more instructions, which when executed by one or more hardware processors causes a method for identification and classification of different grain and adulterant types during grain grading analysis.

The method includes preprocessing an image, received for the grain grading analysis for a grain type, to enhance image quality, wherein the image comprises a sample element mixture comprising a plurality of elements and a reference object, and wherein the preprocessing comprises iterating the image through an image enhancement process till the image satisfies a quality criteria.

Further includes processing the preprocessed image by performing resizing, denoising, and Gaussian blurring to obtain a processed image.

Further includes determine a plurality of morphological features of the plurality of elements in the processed image by performing background elimination using image segmentation and inpainting operation, followed by contour detection on the processed image to obtain a contour plot of each of the plurality of elements and the reference object in the processed image. Then determining i) a calibration factor in terms of pixel per metric for a length, a width and a height, and ii) an aspect ratio to predetermined weight mapping tables of a plurality of reference objects, a plurality of grain types and a plurality of varieties of the plurality of grain types. Thereafter determining the plurality of morphological features of each of the plurality of elements using the contour plot and the calibration factor, wherein the morphological features comprise a perimeter, a width, a height, and an aspect ratio.

Further includes confirming whether the sample mixture is of the grain type by determining whether at least a predefined number of elements among the plurality of elements belong to the grain type, wherein the grain type is identified by binning each of the plurality of elements in accordance with the element aspect ratio into a plurality of bins and checking whether one or more elements associated with a bin, among the plurality of bins, satisfy a kernel aspect ratio range predefined for the grain type.

Further includes differentiating the plurality of elements, post confirming the sample element mixture is of the grain type, wherein the differentiation is based on a lower threshold and an upper threshold of an Inter Quartile Range (IQR) of a perimeter metric corresponding to the perimeter of each of the plurality of elements to segregate the plurality of elements as: a first set of elements having lower size impurity in the sample element mixture, a second set of elements having a target grain perimeter range identified for the grain type, and a third set of elements having a higher size impurity.

Furthermore, includes performing identification of a variety of the grain type, from among the plurality of varieties by binning the second set of elements into a plurality of bins based on the aspect ratio, wherein the aspect ratio associated with a max bin among the plurality of bins that has maximum number of elements from the second set of elements indicates the variety of the grain type being graded in accordance with a predefined aspect ratio to variety mapping. Thereafter calculation of a total adulteration percentage for the variety based on number of elements in the max bin and number of elements in the first set of elements and the second set of elements.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B (collectively referred as FIG. 2) is a flow diagram illustrating a method for identification and classification of different grain and adulterant types during the grain grading analysis, using the system of FIG. 1, in accordance with some embodiments of the present disclosure.

Figure 1:
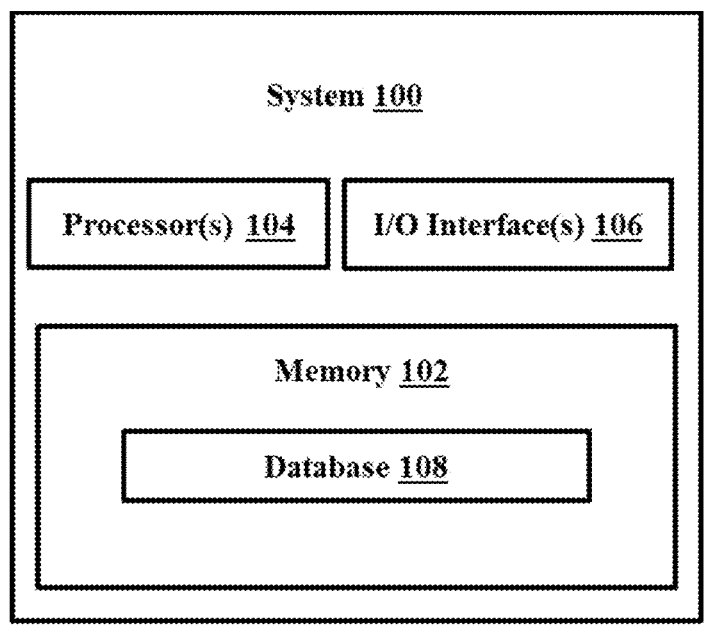
FIG. 1 is a functional block diagram of a system for identification and classification of different grain and adulterant types during grain grading analysis, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

State of art techniques for grain grading analysis mostly rely of computationally intensive, time consuming Neural Networks (NNs). Existing approaches hardly attempt to analyze adulterants into various types and determine adulteration levels using fixed size uniform binning approaches. Accuracy of adulteration level prediction using static bins based approach provide higher level approximation of adulteration levels, which are away from actual adulteration levels in the grain. Further, with non-uniformity is adulterant sizes and variations in adulterant types, classifying the adulterants to specify noticeable general adulterants, grain colored adulterants and grain like Impurities (low quality grain) is technically challenging. The challenge further increases when input grain sample images are not of high resolution images but from general cameras mounted on digital devices such as a smart phone or the like.

Embodiments of the present disclosure provide a method and system for identification and classification of different grain and adulterant types for grain grading analysis. The method analyzes an input image of a grain sample, also referred to as a sample element mixture, using computationally less-intensive techniques comprising image segmentation and contour plots, to determine morphological features of elements. The morphological features are determined using dynamically determined calibration factor from a reference object in the image, enabling more accurate determination of the morphological features of each of the elements in accordance with the resolution of image under test. The morphological features comprise a perimeter, a width, a height, and an aspect ratio. The sample element mixture is checked for a grain type of interest (such as a rice grain) based on the aspect ratio. Further, statistical analysis of variation in the perimeter of the elements is used to perform three class classification to segregate the elements as a target grain size (such as full kernel length of rice grain), low size adulterants and higher size adulterants, without loss of generality that scope of statistical separation (classification) based on perimeter is assumed to include any variations in the form of supervised and unsupervised machine and deep learning methods to achieve the stated objectives. The elements classified as target grain size are further analyzed against a predefined aspect ratio to grain variety mapping, to determine the grain variety. The classified adulterants are used to determine adulteration percentage. Further, the method comprises analyzing the elements based on the target grain size to determine grain colored and non-grain colored adulterants using colored segmentation. The grain colored adulterants are further classified as Grain Like Impurities (GLI), such as broken kernels of grain, and non-GLI such as small stones, using predefined ranges of standard deviation of the perimeter metric. Further, weight of the grain colored adulterants and the non-grain colored adulterant is obtained by mapping the aspect ratio to a corresponding weight from predefined weight tables based on a multiplicative weight factor determined from the reference object.

Further, in an embodiment the method can be implemented on a user end digital device such as the smart phone, and/or a laptop as an application on the digital device with access to cloud support for computing intensive services such as analytical insights for any specific requirements of the user. The application based implementation approach provides a handy and portable, easy to use system that can be even used by individual such as a common buyer, a food inspector to ensure the quality of grain, effectively reducing the adulteration practices as they would be easily identifiable without time consumption for the analysis and results.

Thus, the method and system disclosed herein provides a low cost, computationally less intensive, time efficient easy to implement grain grading analysis, wherein an analysis of type of adulterants and corresponding weight and adulterations levels are provided.

Referring now to the drawings, and more particularly to FIGS. 1 through 6C, where similar reference characters denote corresponding features consistently throughout the figures, there are shown preferred embodiments and these embodiments are described in the context of the following exemplary system and/or method.

It is to be understood that the method disclosed herein in real scenarios handles colored images and a plurality of image analysis processes on color images generating intermediate colored images, for example, contour plot generation in various colors, color segmentation and the like. However, with limitation of using greyscale images, one or more images in the drawings may not distinctly reflect the image components but are indicated in shades of grey.

FIG. 1 is a functional block diagram of a system for identification and classification of different grain and adulterant types during grain grading analysis, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100. Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, smartphones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores the received images of sample element mixtures under test, physical features and dimensions of a reference object used for calibration of the system 100, physical features of grain types and varieties, physical features of possible adulterants, computed morphological features of the grain type being analyzed, aspect ratio to weight mapping tables for all grain types of all varieties, and the like.

Further, the memory 102 includes modules (not shown) such as a display module, a preprocessing module, a processing module, grading module and the like. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIGS. 2 and 3 and example as depicted in FIGS. 4A through 6C.

FIGS. 2A and 2B (collectively referred as FIG. 2) is a flow diagram illustrating a method 200 for identification and classification of different grain and adulterant types during the grain grading analysis, using the system of FIG. 1, in accordance with some embodiments of the present disclosure.

Figure 3:
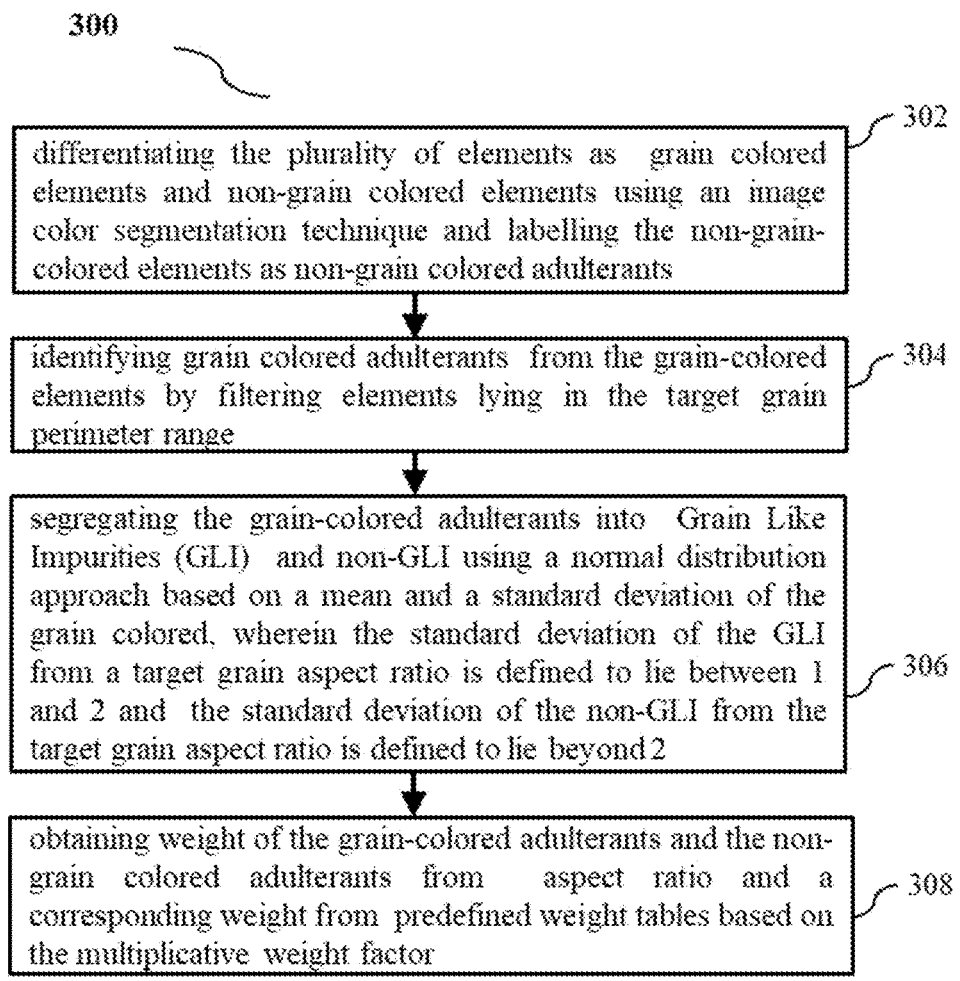
FIG. 3 is a flow diagram illustrating a process of the method for segregating a sample element mixture into non-grain color adulterants, and grain colored adulterants further classified into Grain Like Impurities (GLI) and non-GLI, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2 and FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

As mentioned, the method 200 disclosed herein can receive images of the sample element mixture from any camera, external or internal to the system 100. Thus, the system 100 is capable of receiving the image that may have inconsistent quality, clarity, resolution, or size. Thus, the system 100 preprocesses the input image before being further analyzed for grading analysis and requires a reference object in the image of the sample element mixture that enables dynamic calibration of the system 100 for each received image, irrespective of the quality of image. Thus, for example any standard camera from standard smartphone which has a threshold resolution, is good enough to be used by the system 100 to capture images to be processed for grain grading analysis.

Figure 4A:
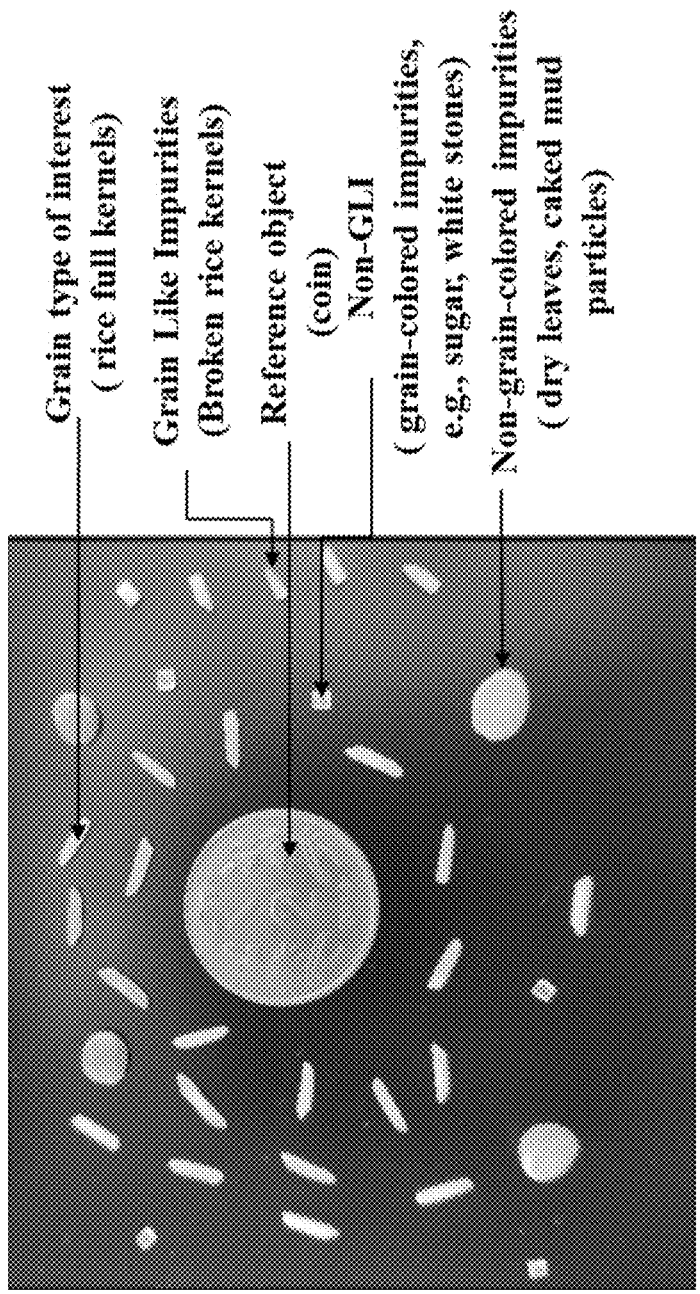
FIG. 4A is a first example illustration for the grain grading analysis carried out over an input image of a sample element mixture for rice grain to identify and classify different grain and adulterant types for the rice grain, in accordance with some embodiments of the present disclosure.
Figure 4B:
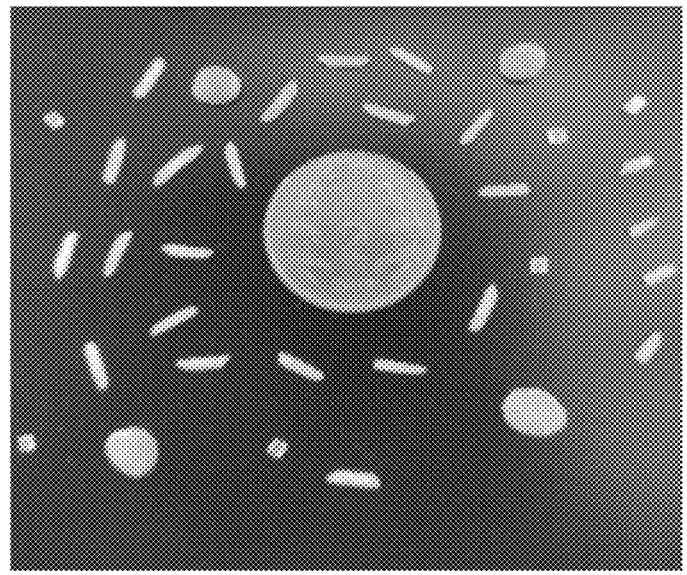
FIG. 4B is a second example illustration for the grain grading analysis carried out over an input image of a sample element mixture for rice grain to identify and classify different grain and adulterant types for the rice grain, in accordance with some embodiments of the present disclosure.

Referring to the steps of the method 200, at step 202 of the method 200, the one or more hardware processors 104 via the preprocessing module executed by the one or more hardware processor 104 preprocess the image, received for the grain grading analysis for a grain type. The grain type herein refers to any grain of interest such as rice, wheat, barley, pulses, and the like for which an end user intends to perform grain grading analysis to access the quality of the grain type of interest. The preprocessing enhances image quality to a desired quality, appropriate for further image analysis. The preprocessing comprises iterating the image through an image enhancement process based on Laplacian coefficients till the image satisfies a quality criteria. The received image is analyzed to check whether image is corrupted. The analysis is based on a set of parameters defining the quality criteria, which may comprise checking whether images are extremely blurred images, indefinitely cropped images, irregularly color generated images etc. If an image is corrupted, blurred, or shaky, to a level that no processing could be performed to derive inference from the received image, the end user may be notified about the same via the display module to upload a better quality image. An example image of a sample element mixture (rice grain and adulterants) is depicted in FIG. 4A. FIGS. 4A through 4P (collectively referred as FIG. 4) show example illustrations for the grain grading analysis carried out over an input image of a sample element mixture for rice grain to identify and classify different grain and adulterant types for the rice grain, in accordance with some embodiments of the present disclosure.

The sample element mixture comprises the grain type (for example rice) along with various types of adulterants including grain colored, non-grain colored varying size adulterants, that specifically may be Grain Like Impurities (GLI) comprising broken grain and inferior quality grain (for example, broken rice kernels of same variety and different variety of rice that the desired grain type).

At step 204 of the method 200, the one or more hardware processors 104 via the processing module executed by the one or more hardware processors 104, process the preprocessed image by performing resizing, denoising, and Gaussian blurring using standard image processing techniques to obtain a processed image. The preprocessed image is resized to a standard height and width with shape as 600×600×3, where the 600×600 is the dimensions of the height and width, while 3 indicates it is an RGB Image. Further, color denoising filter is applied to the image the image is then Gaussian Blurred using a 3×3 mask for 2 iterations to be ready to be passed on to further grading analysis. FIG. 4B depicts the final processed clean image.

Figure 4C:
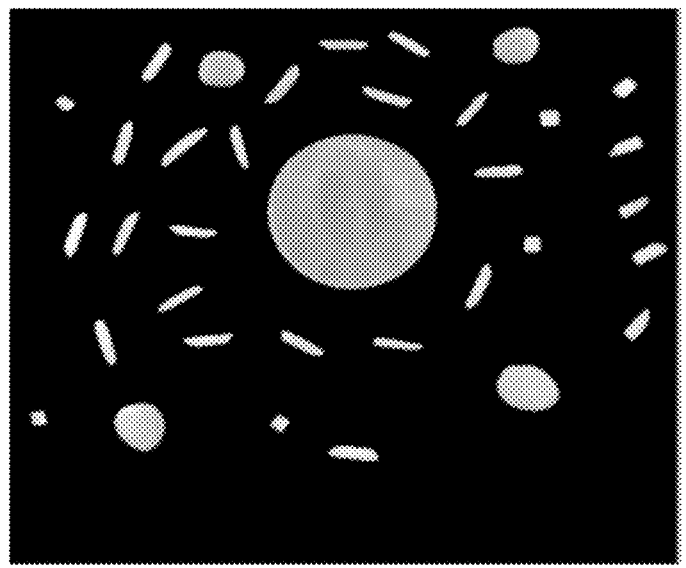
FIG. 4C is a third example illustration for the grain grading analysis carried out over an input image of a sample element mixture for rice grain to identify and classify different grain and adulterant types for the rice grain, in accordance with some embodiments of the present disclosure.
Figure 4D:
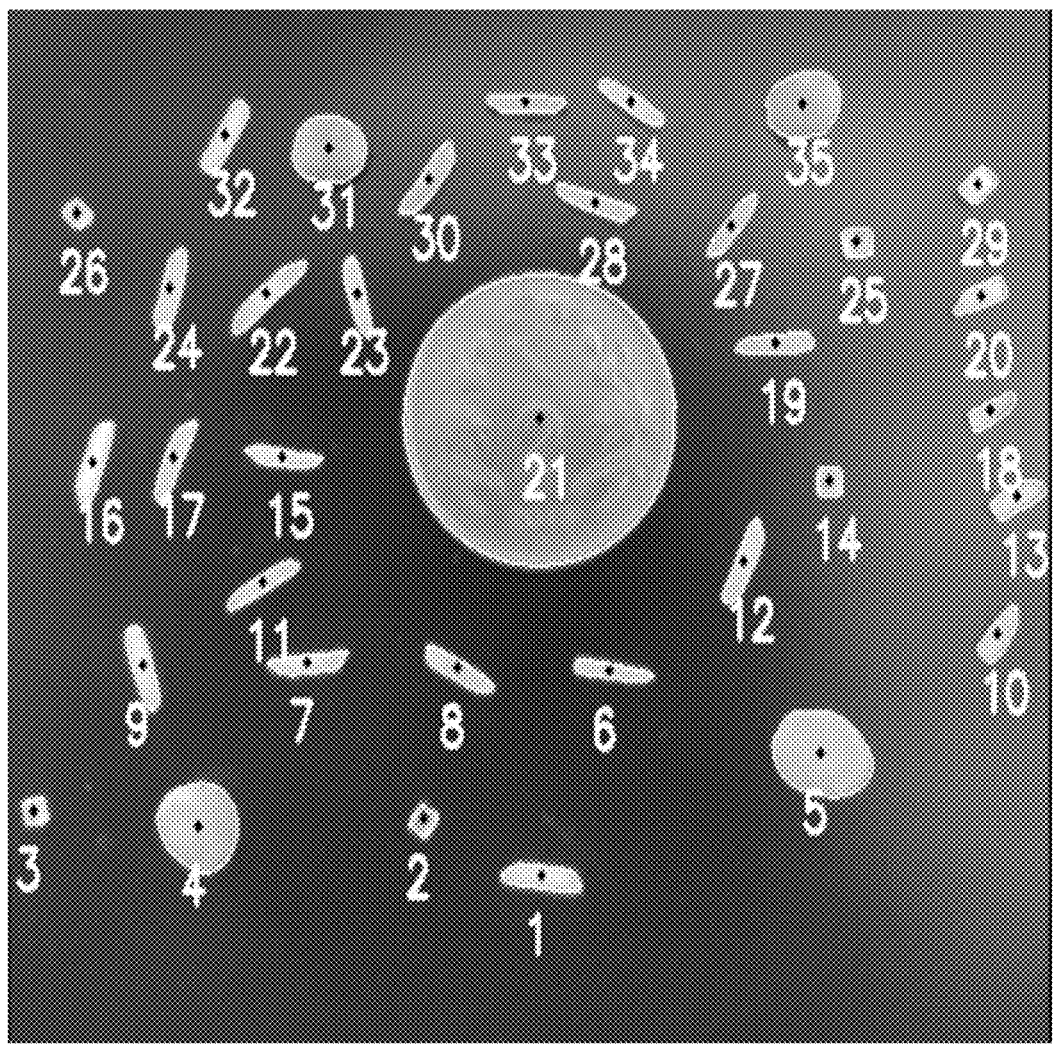
FIG. 4D is a fourth example illustration for the grain grading analysis carried out over an input image of a sample element mixture for rice grain to identify and classify different grain and adulterant types for the rice grain, in accordance with some embodiments of the present disclosure.

At step 206 of the method 200, the one or more hardware processors 104 via the grading module executed by the one or more hardware processors 104 determine a plurality of morphological features of the plurality of elements in the processed image. The steps include:

a) Perform image segmentation on the processed image as depicted in FIG. 4C that eliminates background, further followed inpainting operation that eliminates irregularities in the segmentation results and to remove glare, shadow, and reflection in the image. Further the segmented image is processed for contour detection, as depicted in FIG. 4D, to obtain a contour plot of each of the plurality of elements and the reference object in the processed image. Image segmentation eliminates the background from the image and at the same time retains only the elements present in the sample element mixture. This is implemented by applying mask filters to the image in the HSV color space. The segmented image is converted to gray scale image and thresholding operation is performed to find the edges of all the elements in the sample and a contour plot of all the elements is drawn along the edges.

b) Determine a calibration factor in terms of pixel per metric for a length, a width and a height, and generate an aspect ratio to predetermined weight mapping tables using prior known aspect ratios and weight, of a plurality of reference objects used by the system, a plurality of grain types and a plurality of varieties of the plurality of grain types. This provides a weight calibration reference, which is later used during weight calculation of the grain of identified variety from among known varieties of the grain type being analyzed by the system 100. The generated mapping tables can be stored in the database 108 of the system 100 and to be later used during weight calculation.

Further, to calculate the weight of adulterants, the adulterants are measured in terms of number of kernels of the grain variety, wherein 'K' gives number of kernels per single adulterant. For example, for grain type-Rice, common non-white adulterants include pulses, oilseeds, cereals, sugar kernels and the like. One of the sources where the adulterant grain to number of kernels of rice (grain variety of interest) is available at https://www.arcjournals.org/pdfs/ijrsas/v4-i1/2.pdf (Source-4).

The calibration factor: This based on the known dimension and properties of the reference used in the image. The calibration factor determined is applied to each dimension (morphological feature) of the elements, in the sample element mixture, obtained in terms of pixels, to convert all measurements from image (in pixels) into millimeters (mm). The known width and known height of the reference object within the image is utilized to find the calibration factor as below:

$$\text{pixel}_{per_{metric}} = \frac{(EstimatedMetric(\text{pixels}))}{(KnownMetric(\text{mm}))} \text{ pixels} \quad (1)$$

The resolution of the camera is critical in the analysis, as better the resolution, morphological features are better captured from the received image.

Figure 4E:
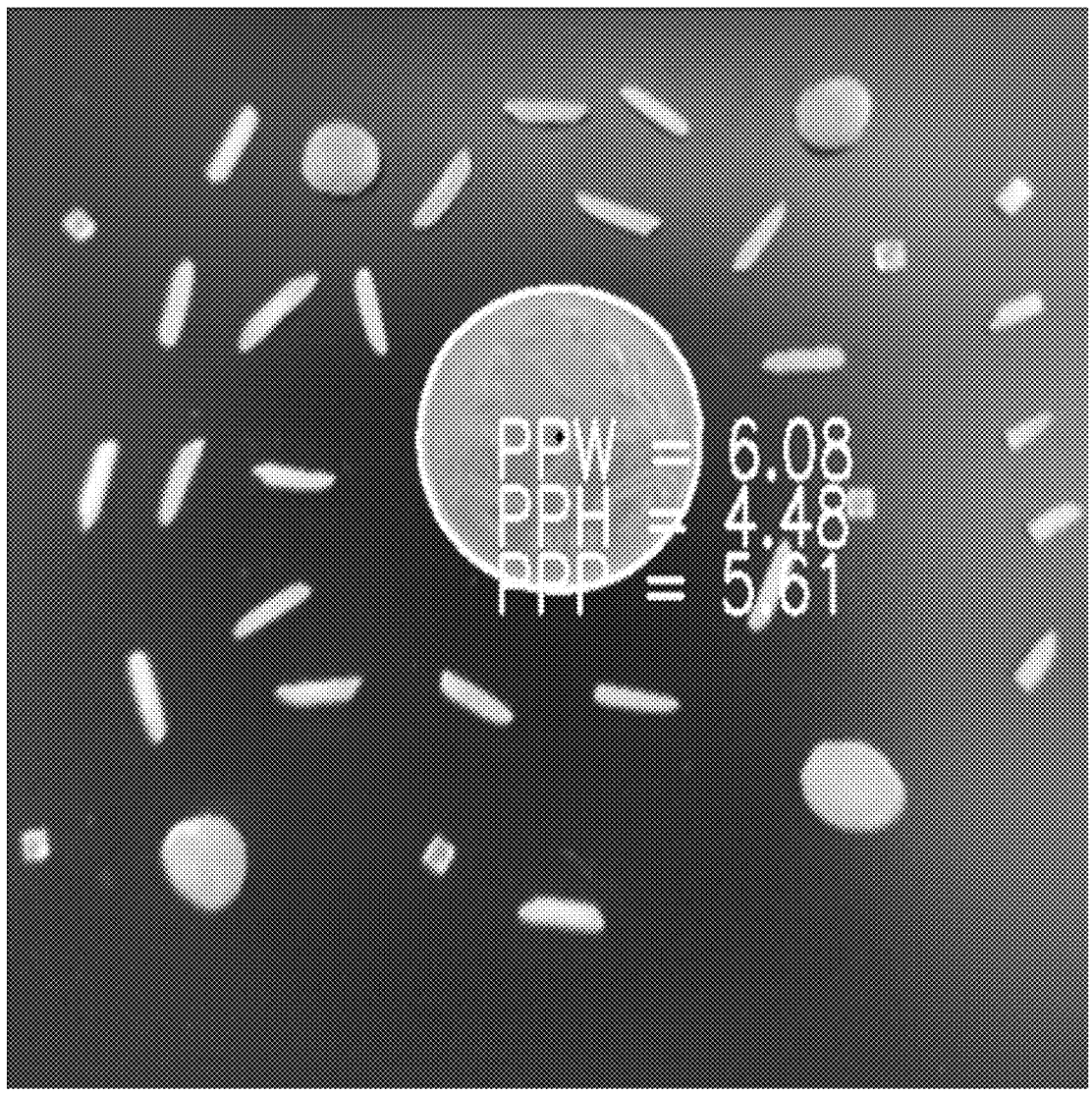
FIG. 4E is a fifth example illustration for the grain grading analysis carried out over an input image of a sample element mixture for rice grain to identify and classify different grain and adulterant types for the rice grain, in accordance with some embodiments of the present disclosure.

The aspect ratio to predetermined weight mapping tables: To determine weight calibration factor, for known weight of the reference objects or grain kernels for all grain varieties of all grain types, dimensions of the kernel, the width and height (i.e. aspect ratio) are identified and corresponding weights are noted. This generates the aspect ratio to predetermined weight mapping tables for the grain type (rice) for different grain varieties of the grain type (Basmati, RSR Rathasali, Kolam). Thus, in the testing scenario, width and height (aspect ratio) of each element of the sample element mixture is first estimated using the calibration factor, and then weight associated for the kernel (element) is computed using its aspect ratio compared with the aspect ratio to predetermined weight mapping tables generated for plurality of grain varieties and grain types that are handled by the system 100. Thus, to generate the aspect ratio to predefined weight mapping tables, grain type, corresponding grain varieties and corresponding grain kernels, kernel dimensions, kernel aspect rations and corresponding kernel weights are obtained from well-known sources. For example, https://www.ncbi.nlm.nih.gov/pmc/articles/PMC6423265/ (Source-1) provides information on physical properties of various paddy cultivars in Southern India. Further, https://www.researchgate.net/publication/271619578_Physical_properties_of_barley_and_oats_cultivars_grown_in_high_altitude_Himalayan_regions_of_India (Source-2) provides information on other grain types and their respective varieties. Typically, the link provides two varieties of oats i.e. Sabzaar (OSb) and SKO-20 (OSk) and that of barley i.e., Hulled (BH) and Hulless (BHL) Similarly, for example reference object herein, which is a standard circulation coin of value 2 Rupees of Republic of India, the features are available at https://en.numista.com/catalogue/pieces24942.html (Source-3). It can be seen that as the object is circular, the aspect ratio is 1 and known weight (4.9 grams) of the reference object. Few relevant features of the reference object are mentioned below:

Features #Reference Object
Country—India
Type-Standard Circulation Coin
Weight—4.9 grams
Diameter—25 mm
Thickness—1.54 mm
Composition—Stainless steel
Shape—Round
Orientation—Medal alignment
Reference—KM #395
As depicted in FIG. 4E, for the example image of the sample element mixture and the reference object used herein:
Pixel Per Width=PPW=6.08,
Pixel Per Height=PPH=4.48, and
Pixel Per Perimeter=PPP=5.61

Figures 4F, 4G:
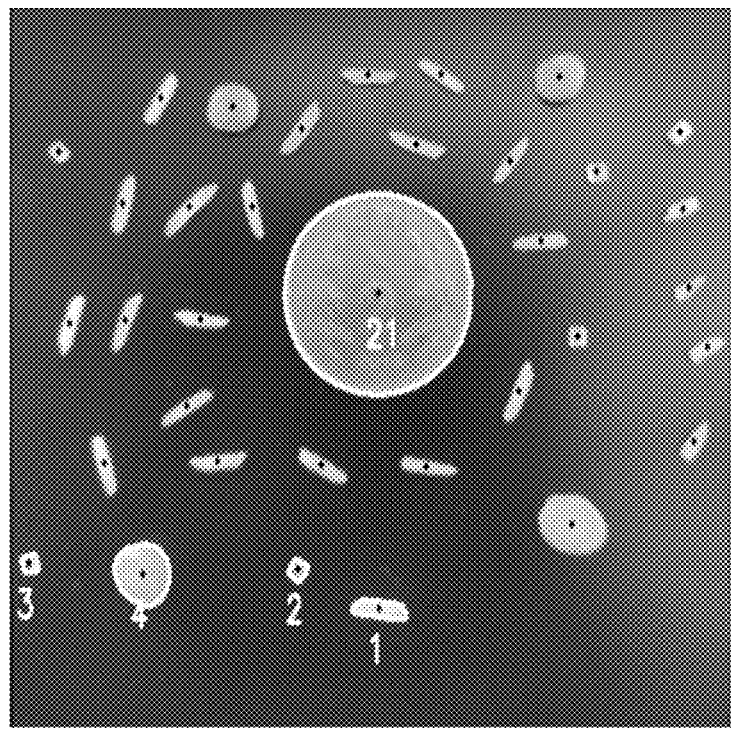
FIG. 4F is a sixth example illustration for the grain grading analysis carried out over an input image of a sample element mixture for rice grain to identify and classify different grain and adulterant types for the rice grain, in accordance with some embodiments of the present disclosure.
FIG. 4G is a seventh example illustration for the grain grading analysis carried out over an input image of a sample element mixture for rice grain to identify and classify different grain and adulterant types for the rice grain, in accordance with some embodiments of the present disclosure.

The weight is computed using the aspect ratio of the reference object mapped with the aspect ratio to predefined weight mapping tables for the reference objects in accordance with the type of object used.

c) Determine the plurality of morphological features of each of the plurality of elements using the contour plot and the calibration factor. The morphological features comprise a perimeter, a width, a height, and an aspect ratio. FIG. 4F, depicts the contour plots of the elements that are used to determine the dimensions of the elements, with each contour of each element marked reference numerals. Corresponding computed morphological features are maintained in tables and stored in memory 102.

Morphological features for each element in the example image of rice grain includes:
1. Perimeter of the Element Kernel in mm
2. Width of the Element Kernel in mm
3. Height of the Element Kernel in mm
4. Aspect Ratio of the Element Kernel Aspect ratio computation: Includes calculation of width and height of each element, which is done by extracting the box points of the minimum enclosing rectangle of each element and calculating the above features, using those points. A major benefit of using the box approach is that it gives close to exact measures and the effect of different angle planes at which is object is placed is nullified. All the metrics are in mm.

FIG. 4G depicts a data frame head of metrics/features generated from the above analysis, wherein all the metrics are in mm. The highlighted boxed row (Component_Num 21) is the row for the reference object. As from the features of the reference object mentioned above, width and height of the reference object is 25 mm (diameter), which is correctly populated in the data frame determined by the system 100. The table additionally depicts 'area' and 'aspect ratio inverse' that is also calculated by the system within the set of the morphological features. These features can be used for any further analysis, within the scope of the method disclosed.

Figure 4H:
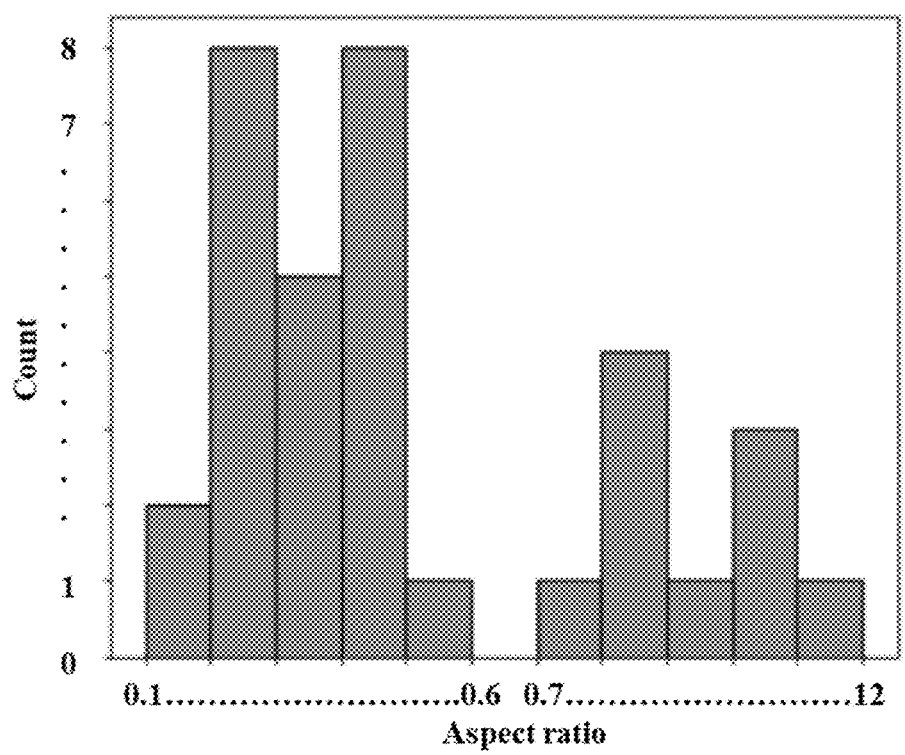
FIG. 4H is a eight example illustration for the grain grading analysis carried out over an input image of a sample element mixture for rice grain to identify and classify different grain and adulterant types for the rice grain, in accordance with some embodiments of the present disclosure.
Figure 4I:
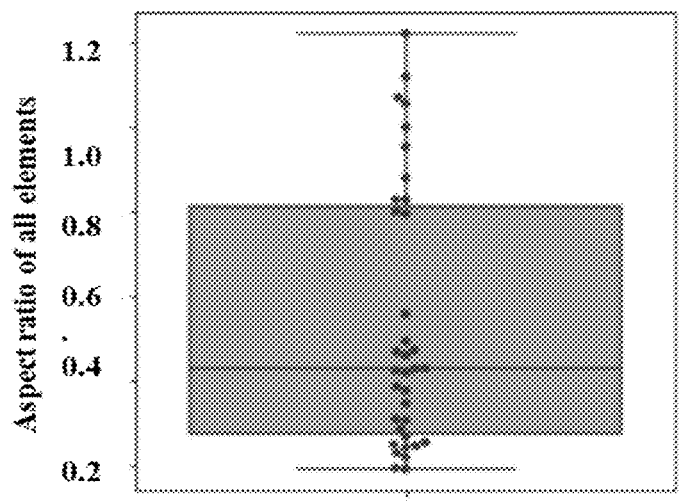
FIG. 4I is a ninth example illustration for the grain grading analysis carried out over an input image of a sample element mixture for rice grain to identify and classify different grain and adulterant types for the rice grain, in accordance with some embodiments of the present disclosure.
Figure 4J:
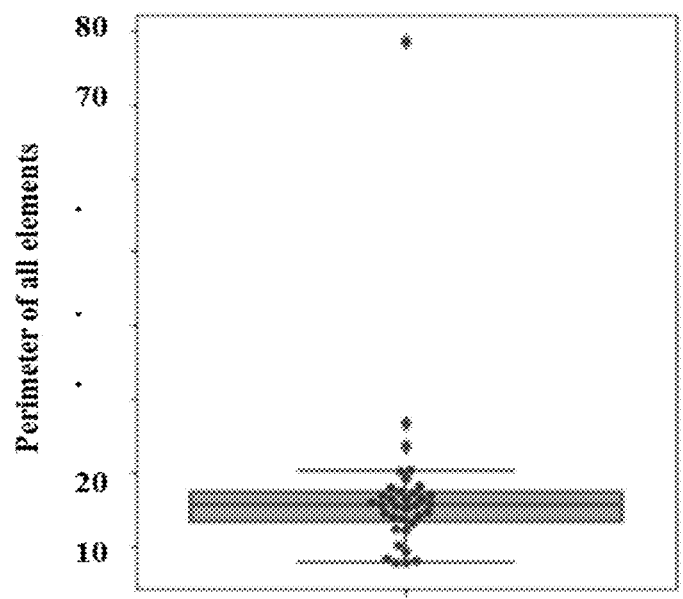
FIG. 4J is a tenth example illustration for the grain grading analysis carried out over an input image of a sample element mixture for rice grain to identify and classify different grain and adulterant types for the rice grain, in accordance with some embodiments of the present disclosure.

Once the morphological features are obtained for each of the plurality of elements, at step 208 of the method 200, the one or more hardware processors 104 confirm whether the sample mixture is of the grain type before proceeding with the further grading analysis. The confirmation is performed by determining whether at least a predefined percentage of elements among the plurality of elements belong to the grain type. The predefined percentage can be set by the user or a subject matter expert to 30%, 40% or the like. This step also enables to ensure if the sample is not empty sample. The grain type is identified by binning each of the plurality of elements in accordance with the element aspect ratio into a plurality of bins and checking whether one or more elements associated with a bin satisfy a kernel aspect ratio range predefined for the grain type. FIG. 4H, depicts a histogram of aspect ratio of grain in the sample element mixture (sample). It can be observed that most aspect ratios lie below 0.6, indicating it is a rice sample. Thus, if the sample is not to the required percentage of the grain type being analyzed, a notification can be provided to the user over a display via the display module to confirm to proceed or restart with the right sample. Thus, binning the aspect ratios of all elements in the sample element mixture enables identifying the aspect ratio range where the maximum element count is accumulated. So, if maximum number of elements lie in the range is below 0.6 mm for the sample element mixture, it indicates the grain type is rice. It can be understood that the database can be updated with range of aspect ratios of grain grown in that geography to enable identifying the grain type. For example, most of the rice kernels (grain type of interest), the typical aspect ratio in mm falls in the range up to 1 mm, which may vary depending on the geography. However, in scenarios grain type of interest is hardly present, and may have only adulterants, the method 200 can further progress to step of adulterant classification. User may be accordingly notified about undesired sample and if he would wish to proceed with analysis of adulterants in the undesired sample. Typically, a user can specify a predefined number of elements among the plurality of elements that he expects to be belonging to the grain type. This can be specified by user as a percentage grain of interest desired to be present in the sample, such as 40%, 50% and so on.

In scenario where it is confirmed that the sample element mixture is of the grain type of interest, it is required to automatically identify the variety of the grain type being analyzed. For example, from the rice grain identified, identifying rice variety is necessary, to check if the rice grain of variety of interest, say Basmati, RSR Rathasali, Kolam or the like. Thus, at step 210 of the method 200, the one or more hardware processors 104 differentiate the plurality of elements, wherein the differentiation is based on a lower threshold and an upper threshold of an Inter Quartile Range (IQR) of a perimeter metric corresponding to the perimeter of each of the plurality of elements to segregate the plurality of elements as:

a) A first set of elements having low size impurities.
b) A second set of elements having a target grain perimeter range, wherein the knowledge of the perimeter for say the Basmati rice is well known and defined in the system 100.
c) A third set of elements having a higher size impurities.

Figures 4K, 4L:
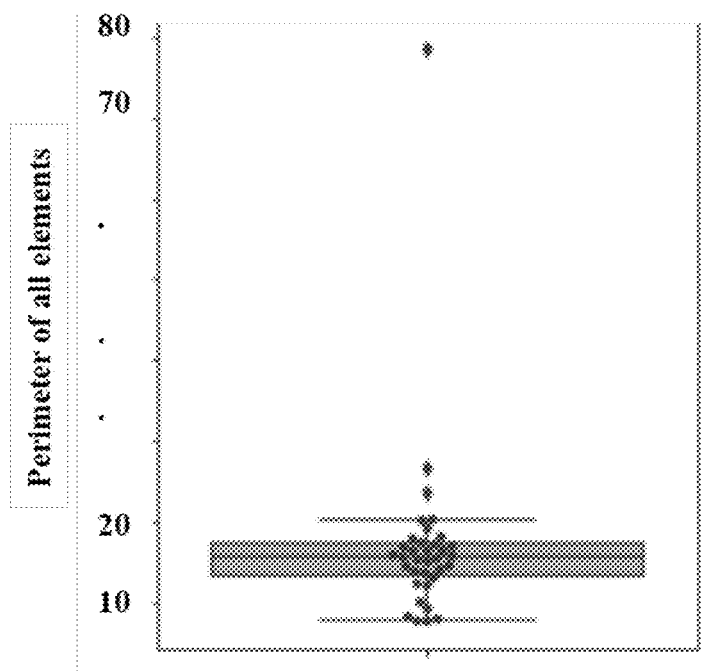
FIG. 4K is an eleventh example illustration for the grain grading analysis carried out over an input image of a sample element mixture for rice grain to identify and classify different grain and adulterant types for the rice grain, in accordance with some embodiments of the present disclosure.
FIG. 4L is a twelfth example illustration for the grain grading analysis carried out over an input image of a sample element mixture for rice grain to identify and classify different grain and adulterant types for the rice grain, in accordance with some embodiments of the present disclosure.
Figure 4M:
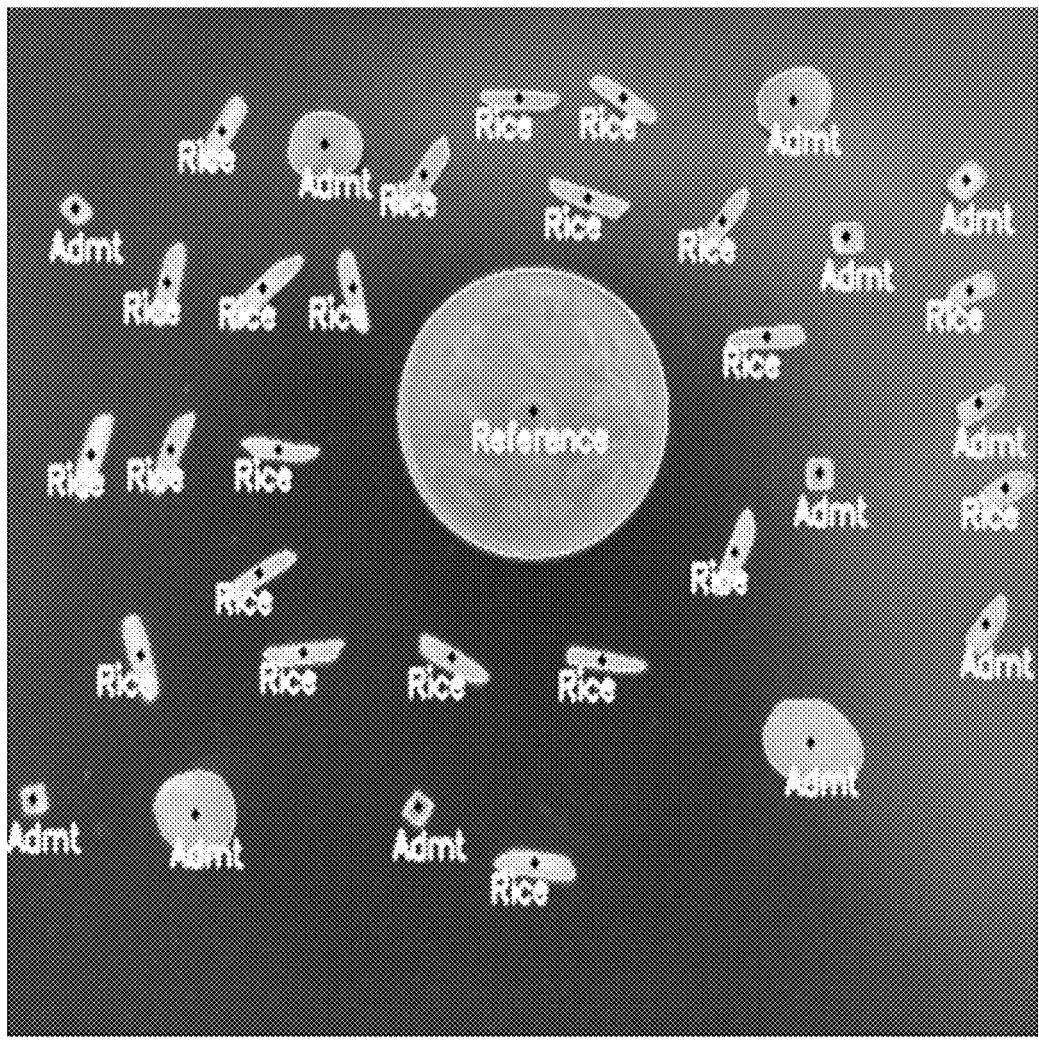
FIG. 4M is a thirteenth example illustration for the grain grading analysis carried out over an input image of a sample element mixture for rice grain to identify and classify different grain and adulterant types for the rice grain, in accordance with some embodiments of the present disclosure.

The above classification is also termed as 3-class classification and indicates that other than the rice kernels (target grain perimeter range defined) all other elements are termed as adulterants effectively creating a two class classification as grain and adulterants as depicted in 4M. It can be noted that short length broken rice is also identified as an adulterant. Inferring from the boxplots of FIGS. 4I and 4J, the perimeter information is used to broadly classify the elements into lower size impurity in the sample element mixture, the target grain perimeter range (target rice kernel range) and higher size impurity in the sample element mixture (sample). The binning of elements into their respective classes are done based on perimeter values and their distribution. The boxplot of FIG. 4K illustrates that the perimeter for the target rice, falls within box and all the adulterants fall outside the box. In order to choose the range for the rice kernels the summary statistics table depicted in FIG. 4K is used. The definition and ranges for the 3-class classification are calculated as shown below 1) Target grain perimeter range (target rice—full length kernels): This requires the calculation of Inter Quartile Range (IQR) for the perimeter metric, which is calculated as using table shown FIG. 4L.

$$IQR = (75th\ \text{percentile}) - (25th\ \text{percentile}) = 17.23 - 13.30 = 3.93$$

Lower Threshold is calculated as:

$$LT = \text{ceil}(\text{Mean} - IQR) = \text{ceil}(16.92 - 3.93)$$
$$LT = 13$$

Upper Threshold is calculated as $$UT = \text{floor}\ (\text{Mean} + IQR)$$
$$= \text{floor}\ (16.92 + 3.93)$$
$$UT = 20$$

The Target Rice falls under the Range~(13-20)

2) Lower size Impurity in the Sample: The Lower impurity in the Sample is calculated using the Lower threshold from the Target Rice and from the FIG. 4L summary stats. As depicted in FIG. 4A, the lower size impurity can be broken rice kernels or stones.

LT of Lower Impurity=Minimum of Perimeter of all Elements

UT of Lower Impurity=LT of Target Rice

The Lower Impurity in the Sample falls under the Range~ (7.62-13)

3) Higher size Impurity in the Sample: The Higher impurity in the Sample is calculated using the Upper threshold from the target rice and from the FIG. 4L summary stats.

LT of Lower Impurity=UT of the Target Rice
HT of Lower Impurity=Maximum of Perimeter of all Element
The higher impurity in the sample falls under the Range~ (20-78.56)

The proportionate elements will have a very low aspect ratio as in case of reference object which has equal width and height.

One scenario can be that the sample is free from major adulterants and only the rice kernels are present in the sample. In this scenario, the method can directly analyze rice kernels to classify into various grades and is explained in conjunction in FIG. 3.

Figure 4N:
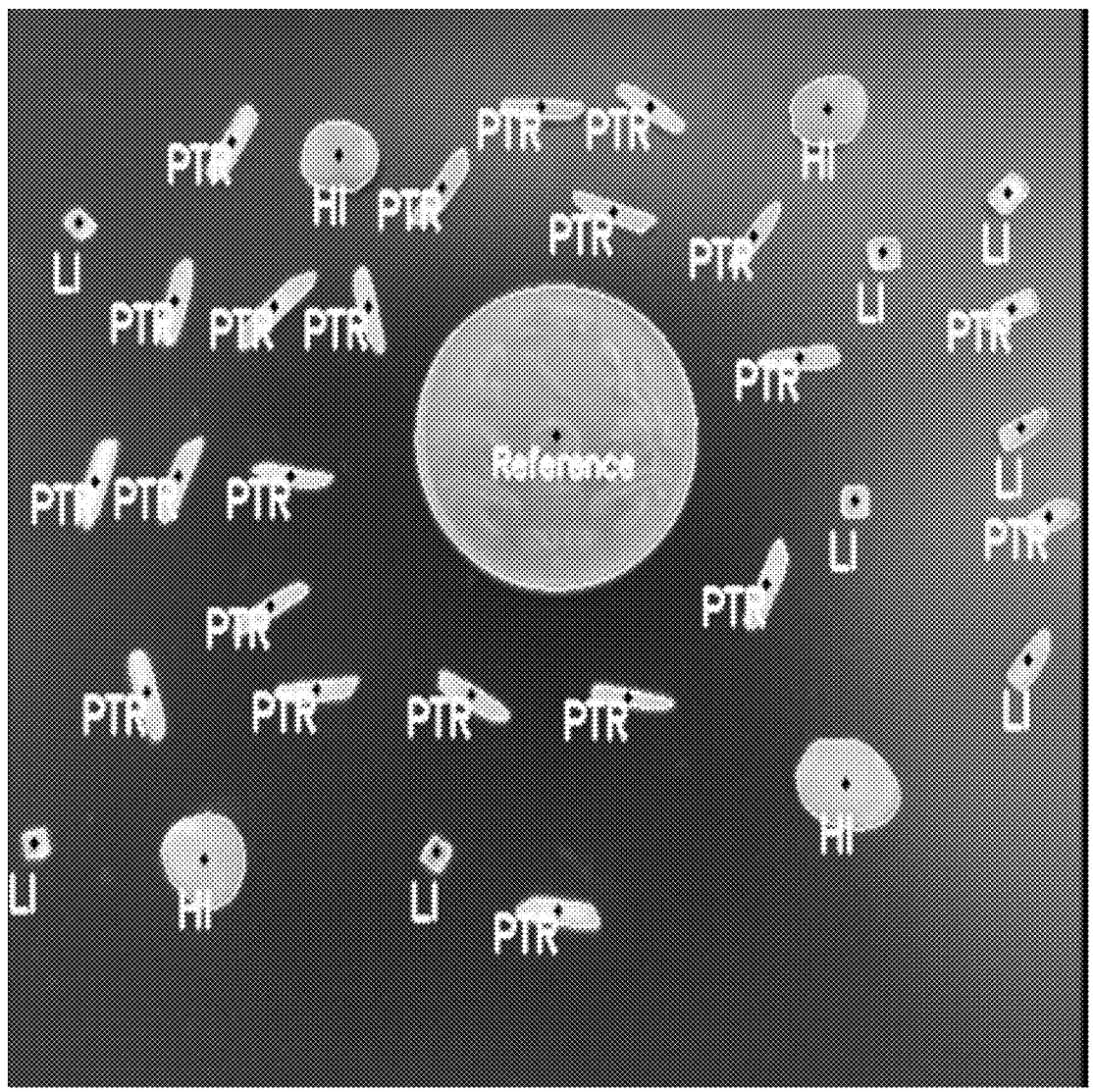
FIG. 4N is a fourteenth example illustration for the grain grading analysis carried out over an input image of a sample element mixture for rice grain to identify and classify different grain and adulterant types for the rice grain, in accordance with some embodiments of the present disclosure.
Figures 4O, 4P:
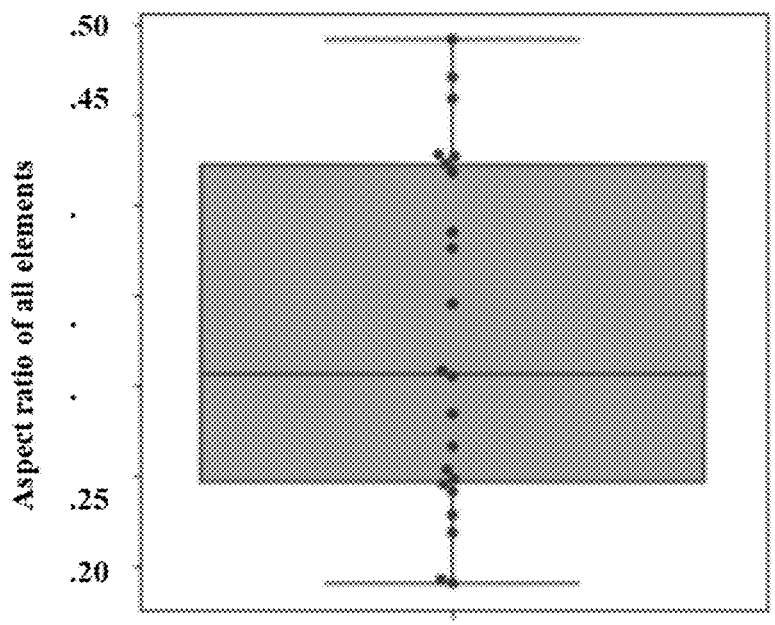
FIG. 4O is a fifteenth example illustration for the grain grading analysis carried out over an input image of a sample element mixture for rice grain to identify and classify different grain and adulterant types for the rice grain, in accordance with some embodiments of the present disclosure.
FIG. 4P is a sixteenth example illustration for the grain grading analysis carried out over an input image of a sample element mixture for rice grain to identify and classify different grain and adulterant types for the rice grain, in accordance with some embodiments of the present disclosure.

FIG. 4N depicts the 3-class classification. However, the above classification just separates the grain from adulterants, but does not specify the variety to the user. Thus, automated grain variety identification is provided by the system 100. At step 210 of the method 200, the one or more hardware processors 104 perform:

a) Identification of a variety of the grain type, from among the plurality of varieties by binning the second set of elements (rice kernels) into a plurality of bins based on the aspect ratio. As depicted by the box plot of FIG. 4O, and summary stats in FIG. 4P, the aspect ratio associated with a max bin among the plurality of bins that has maximum number of elements from the second set of elements indicates the variety of the grain type being graded. This is identified in accordance with a predefined aspect ratio to variety mapping which is obtained from source-1. Once the rice kernels belonging to the target rice are separated from the adulterants as depicted in FIG. 4M, the elements under target grain perimeter range class (typically for the example herein, the target rice class) are analyzed to find the variety of grain under test. The different aspect ratios of the rice kernels falling under the target grain perimeter range class are analyzed and binned it accordingly to the aspect ratio. Further, the bin with the maximum number of kernels is classified as the variety of rice based on the aspect ratio to variety mapping. This identified variety can be displayed to the end user by the display module. This is very similar to how the histogram of FIG. 4H was used to identify whether the sample is a rice grain. Here, if any inferior quality rice or broken kernels of the same rice variety are present, they are automatically binned into different bins based on the aspect ratio. This binned output can then be used in the subsequent steps to differentiate between rice kernel and Grain Like Impurities as explained in conjunction with FIG. 3.

b) Further, calculation of a total adulteration percentage for the variety identified is performed based on number of elements in the max bin and number of elements in the first set of elements and the second set of elements. The two class classification of FIG. 4M is used to calculate the total adulteration in the sample as below:
Total Elements—35
Rice Kernels—23
Adulterants—12

$TotalAdulteration(\%\ basedoncount)$ $$\frac{(CountofAdulterants)}{(TotalElements)} * 100\% = 12/35 = 34.28\%$$

The adulteration percentage derived by the system can be displayed to the end user via the display module.

Figure 5A:
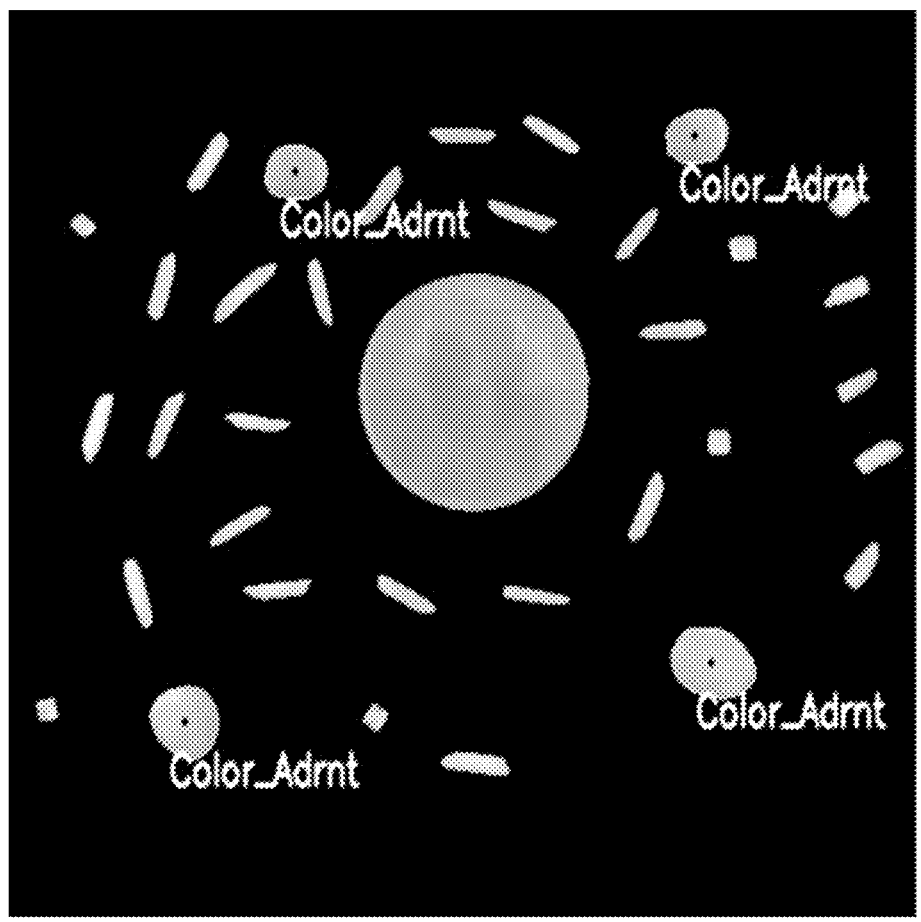
FIG. 5A is a first example illustration for segregating the sample element mixture of the rice grain into non-grain color adulterants and grain colored adulterants, in accordance with some embodiments of the present disclosure.
Figure 5B:
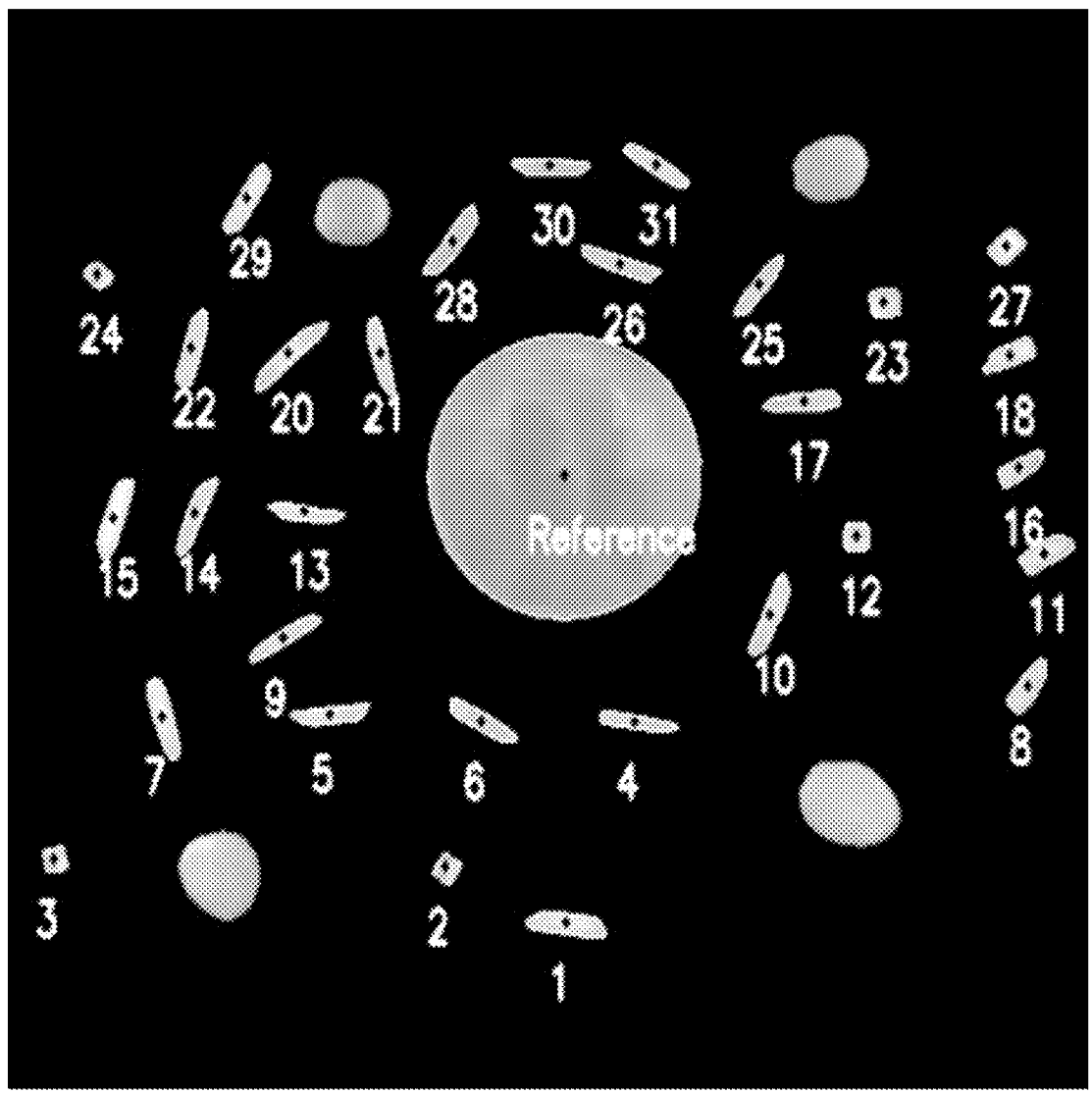
FIG. 5B is a second example illustration for segregating the sample element mixture of the rice grain into non-grain color adulterants and grain colored adulterants, in accordance with some embodiments of the present disclosure.

FIG. 3 is a flow diagram illustrating a process of the method 300 for segregating a sample element mixture into non-grain color adulterants, and grain colored adulterants further classified into Grain Like Impurities (GLI) and non-GLI, using the system of FIG. 1, in accordance with some embodiments of the present disclosure. At step 302, the one or more hardware processors via the grading module differentiate the plurality of elements as grain colored elements and non-grain colored elements using an image color segmentation technique and labelling the non-grain colored elements as non-grain colored adulterants, as depicted in FIG. 5A and with grain colored elements labeled as in FIG. 5B. FIGS. 5A through 5D are collectively referred as FIG. 5. A mask is created to differentiate the white (grain colored) with non-white (non-grain colored) adulterants present in the sample. The mask is effectively generated after trying out different combination of the RGB filter values to efficiently cater to the 'One Mask fits All' criteria for white and Non-White Classification. Here the white classified results contain both the rice variety and adulterants together if any as they are only segmented based on color.

Figure 5C:
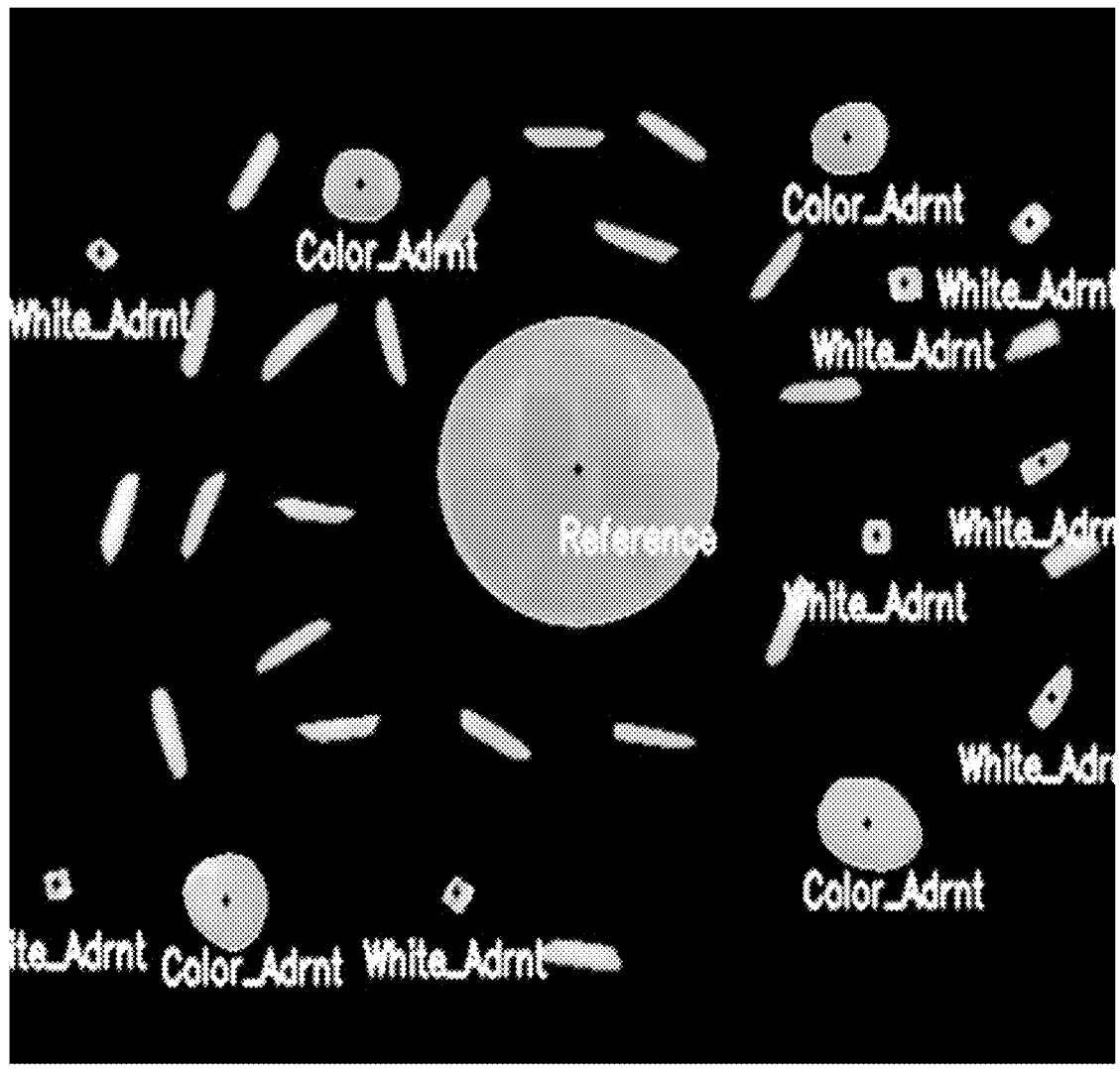
FIG. 5C is a third example illustration for segregating the sample element mixture of the rice grain into non-grain color adulterants and grain colored adulterants, in accordance with some embodiments of the present disclosure.
Figure 5D:
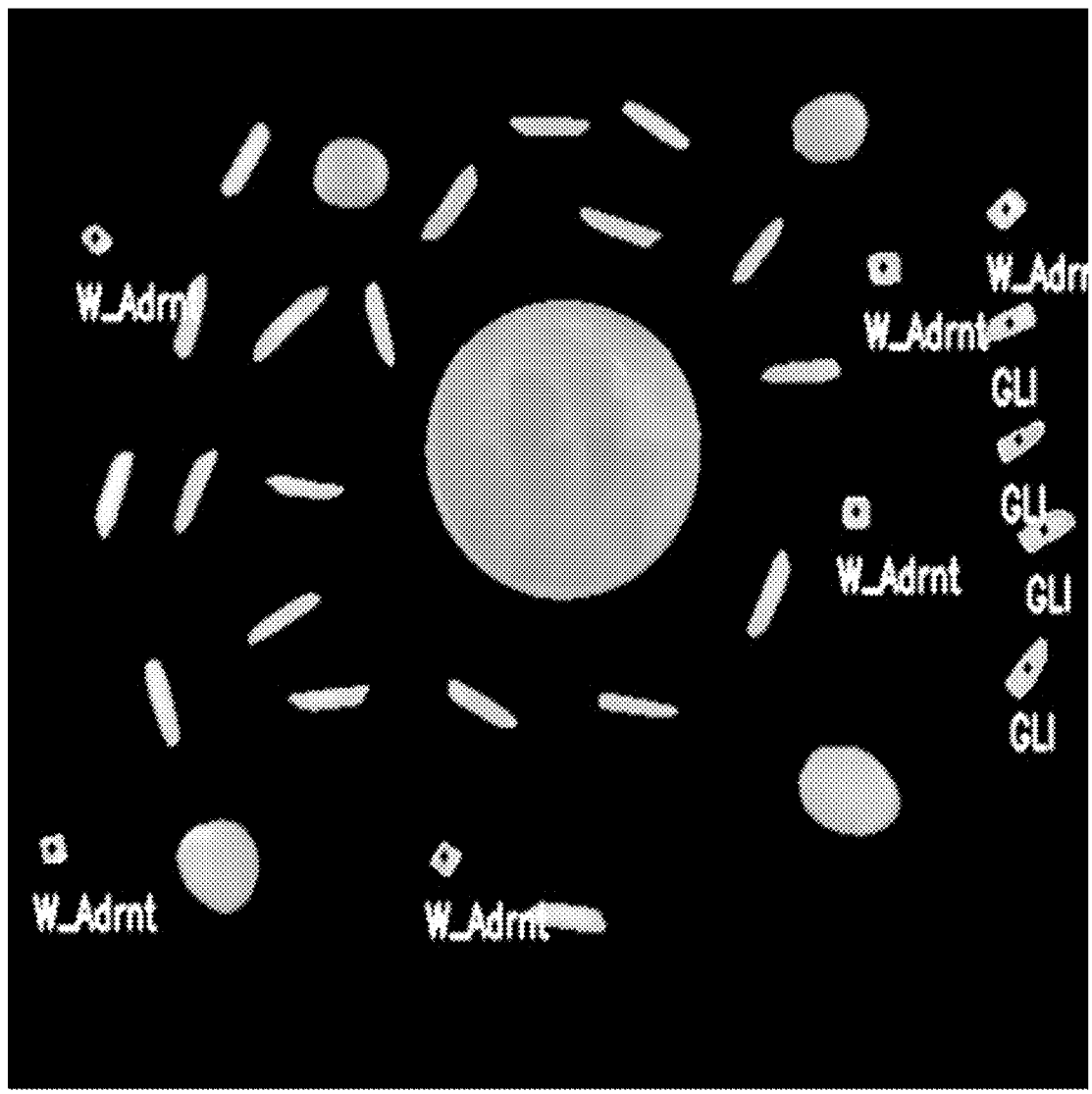
FIG. 5D is a fourth example illustration for segregating the sample element mixture of the rice grain into non-grain color adulterants and grain colored adulterants, in accordance with some embodiments of the present disclosure.
Figures 6A, 6B:
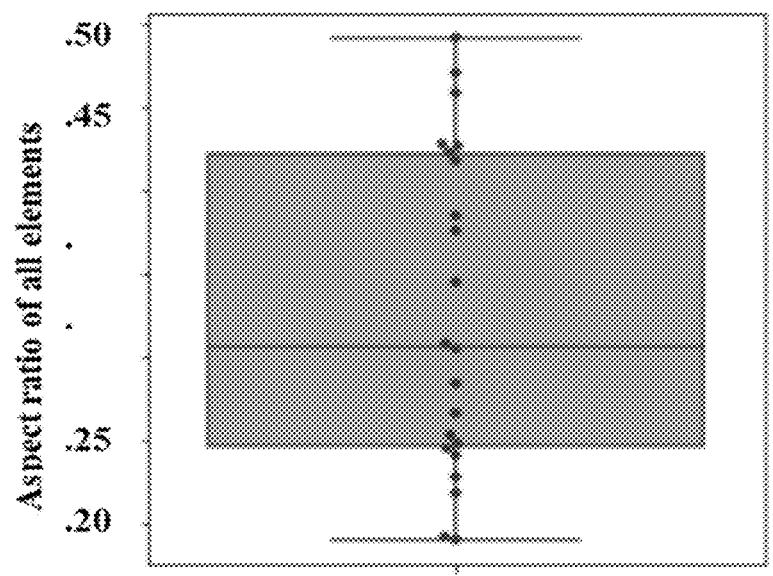
FIG. 6A is a first example illustration for segregating the grain colored adulterants further into the Grain Like Impurities (GLI) and the non-GLI, in accordance with some embodiments of the present disclosure.
FIG. 6B is a second example illustration for segregating the grain colored adulterants further into the Grain Like Impurities (GLI) and the non-GLI, in accordance with some embodiments of the present disclosure.
Figure 6C:
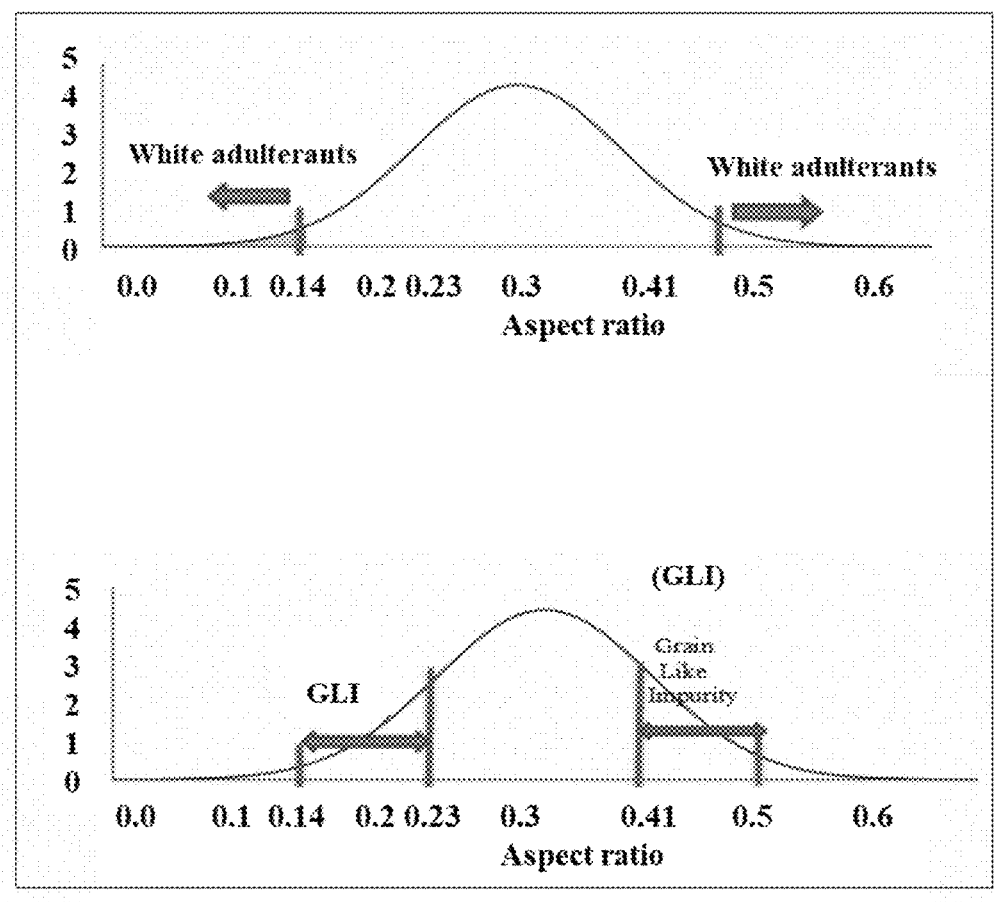
FIG. 6C is a third example illustration for segregating the grain colored adulterants further into the Grain Like Impurities (GLI) and the non-GLI, in accordance with some embodiments of the present disclosure.

At step 304, the one or more hardware processors via the grading module identify grain-colored adulterants from the grain-colored elements using the target grain perimeter range as depicted in FIG. 5C. At step 306, the one or more hardware processors via the grading module segregate the using a normal distribution approach based on a mean and a standard deviation of the grain colored adulterants into Grain Like Impurities (GLI) and non-GLI as depicted in FIG. 5D. The standard deviation of the GLI from a target grain aspect ratio range is defined to lie between 1 and 2 and the standard deviation of the non-GLI from the target grain aspect ratio range is defined to lie beyond 2. The box plot of FIG. 6A, the summary stats of FIG. 6B indicate the aspect ratio relation between GLI and non-GLI. The standard deviation for GLI, non-GLI in depicted in FIG. 6C.

At step 308, the one or more hardware processors 104 obtain weight of the grain colored adulterants and the non-grain colored adulterant by mapping the aspect ratio and to a corresponding weight from aspect ratio to predefined weight mapping tables.

Calculating the Compound Weight of Adulterants Classified as Non-Grain Colored Adulterants, Grain Color Adulterants (White Adulterant) and GLI for the Example Rice Sample:

In this sub step, the weight associated with all rice and different classes of adulterants identified is calculated. Assuming variety of rice as RSR Rathasali.

Step-I: Calculate the weight of rice kernels and adulterants as a whole. The weight is calculated for the rice kernels identified using the 1000 kernel weight for that identified rice variety. Taking the previous computation ahead for weightage calculation, available is 1) Total elements—35
2) Rice Kernels—23
3) Adulterants 12

TABLE 1

| Elements | AR Ranges (in mm) | Mean of AR in that Bin | SD of AR in that bin | 1000 Kernel Weight |
|---|---|---|---|---|
| Rice Kernels | 0.19-0.49 | 0.3270.09 | 0.09 | 14.32 |

AR—Aspect Ratio,
SD—Standard Deviation

Based on the total elements and predicted rice kernels the calculated weight for 21 rice kernels are as follows Weight of 21 rice kernels=(23×14.32)/1000=0.323 grams (gms)

Weight when all the elements were classified as Rice Kernels=0.501 gms

Deficit in weight as compared to 35 elements=0.501−0.300=0.178 gms

Therefore, Actual Sample weight of rice kernels=0.323 grams

Weight Breakup for different adulterants: Using reference from standard available sources for kernel weights and using differentiation of white (grain colored) and colored (non-grain colored) adulterants steps are explained below:

TABLE 2

| Elements | Count of elements | AR Ranges (in mm) | Mean of AR in that Bin | SD of AR in that bin | 1000 Kernel Weight |
|---|---|---|---|---|---|
| Grain colored adulterant | 4 | 0.8-1.12 | 0.91 | 0.144 | 1.7 |
| White adulterant | 6 | Lower than 0.14 and higher than 0.5 | 1.015 | 0.126 | 0.0625 |
| GLI | 2 | Higher than 0.14 and lower than 0.23 Higher than 0.41 and lower than 0.5 | 0.495 | 0.007 | 10.74 |

The weight of a broken rice kernel is taken to be 75% of the weight of the whole rice kernel.

A) Calculation of white adulterant weight as % of Whole Sample weight of identified rice. Referring to table 2, the 1000 kernel weight in that Aspect ratio range is=(6×0.0625)/1000=0.0003 grams(gms)=1% of whole Sample Weight of rice kernels.

B) Calculation of colored adulterant weight as % of Whole Sample weight of identified rice. Referring to table 2, the 1000 kernel weight in that Aspect ratio range is=(4×1.7)/1000=0.0068 gms=2.267% of whole Sample Weight of rice kernels C) Calculation of GLI weight as % of Whole Sample weight of identified rice. Referring to table 5, the 1000 kernel weight in that Aspect ratio range is =(5×10.74)/1000=0.0215 gms=6.7% of whole Sample Weight of rice kernels.

D) Total weight of all Adulterants=0.0003+0.0068+0.0215=0.0286 gms=8.9% of Whole Sample.

E) Interpretation of the Percentages Weight

1. The weight of adulterants is 8.9% of the weight of rice kernels in the sample under test which is added to the sample's overall weight.

2. This means that the adulterants would cause an increase of 8.9% in weight i.e. 0.3516 grams while the weight of rice kernels is only 0.323 grams. Thus, there are 3 outputs from this stage as:—
   (White Adulterant): 1%
   2(Colored Adulterant): 2.267%
   3(GLI): 6.7%

Predicting the Final Grade of the Rice variety: In this sub step, the predicted rice variety is graded based on the calculated metrics, which is been passed to this final step of grading. The final grading of the rice is done taking the various metrics such as Total adulteration (in % based on count), breakup of the adulterant percentages and using the required grading standards for that grain depending on factors such as Geography, soil, condition, pesticide requirements and many more. The system 100 can be configured to display the intermediate and/or final grading analysis results to the user.

Display Module: Notifications to user in example scenarios are provided below:

When at step 208 it is identified that the sample is empty sample then the display module displays a notification to user as, say for example, No Grains identified in order to Grade, please capture new Image to Grade!

For the weight computation example above, the display reads:
Variety: RSR Rathasali
Grain by Count of whole Sample: 65.72%
Total Adulteration (in % based on count): 34.28%
Distribution of Adulterants by Weight(in % based on Weight):
  1:1%
  2: 2.267%
  3: 6.7%
Final Grade: Calculated as per required Standards Similarly, at step 208, if the sample is not of the desired grain type but only adulterants, the display module send the following information to be displayed to end user Using the above running example to get the context, we will consider that we have no target rice in the sample and therefore after the analysis following output is provided:
Distribution of Adulterants by Weight(in % based on Weight):
  1:1%
  2: 2.267%
  3: 6.7%

Thus, the method and system disclosed herein provides a low cost, computationally less intensive, robust, dynamic calibration based easy to implement grain grading analysis system, wherein an analysis of type of adulterants to level of GLI is analyzed and corresponding weight and adulterations levels are provided. The method and system disclosed herein can be expanded to different geography and configured to identify the generic adulterants in that geography. The system disclosed in easily implementable on regular personal digital assistants such as smartphones, laptops and the like enabling the use of the grain grading analysis at ground level stakeholders of agro-based tasks, such as by retailers, wholesalers and even the end consumer.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for grain grading analysis, the method comprising:

preprocessing an image, by one or more hardware processors, received for the grain grading analysis for a grain type, to enhance image quality, wherein the image comprises a sample element mixture comprising a plurality of elements and a reference object, and wherein the preprocessing comprises iterating the image through an image enhancement process till the image satisfies a quality criteria;

processing the preprocessed image, by the one or more hardware processors, by performing resizing, denoising, and Gaussian blurring to obtain a processed image;

determining, by the one or more hardware processors, a plurality of morphological features of the plurality of elements in the processed image by:

a) performing background elimination using image segmentation and inpainting operation, followed by contour detection on the processed image to obtain a contour plot of each of the plurality of elements and the reference object in the processed image;

b) determining i) a calibration factor in terms of pixel per metric for a length, a width and a height, and ii) an aspect ratio to predetermined weight mapping tables of a plurality of reference objects, a plurality of grain types and a plurality of varieties of the plurality of grain types; and c) determining the plurality of morphological features of each of the plurality of elements using the contour plot and the calibration factor, wherein the morphological features comprise a perimeter, a width, a height, and an aspect ratio;

confirming, by the one or more hardware processors, whether the sample mixture is of the grain type by determining whether at least a predefined number of elements among the plurality of elements belong to the grain type, wherein the grain type is identified by binning each of the plurality of elements in accordance with the element aspect ratio into a plurality of bins and checking whether one or more elements associated with a bin, among the plurality of bins, satisfy a kernel aspect ratio range predefined for the grain type;

differentiating, by the one or more hardware processors, the plurality of elements, post confirming the sample element mixture is of the grain type, wherein the differentiation is based on a lower threshold and an upper threshold of an Inter Quartile Range (IQR) of a perimeter metric corresponding to the perimeter of each of the plurality of elements to segregate the plurality of elements as:

a) a first set of elements having lower size impurity in the sample element mixture, b) a second set of elements having a target grain perimeter range identified for the grain type, and c) a third set of elements having a higher size impurity; and performing, by the one or more hardware processors:
a) identification of a variety of the grain type, from among the plurality of varieties by binning the second set of elements into a plurality of bins based on the aspect ratio, wherein the aspect ratio associated with a max bin among the plurality of bins that has maximum number of elements from the second set of elements indicates the variety of the grain type being graded in accordance with a predefined aspect ratio to variety mapping; and
b) calculation of a total adulteration percentage for the variety based on number of elements in the max bin and number of elements in the first set of elements and the second set of elements.

2. The method of claim 1, wherein the method further comprises differentiating the plurality of elements as grain colored elements and non-grain colored elements using an image color segmentation technique and labelling the non-grain colored elements as non-grain colored adulterants.

3. The method of claim 2, wherein the method further comprises:
identifying rain-colored adulterants from the grain colored elements by filtering elements lying within the target grain perimeter range; and
segregating using a normal distribution approach based on a mean and a standard deviation of the grain colored adulterants into Grain Like Impurities (GLI) and non-GLI, wherein the standard deviation of the GLI from a target grain aspect ratio range is defined to lie between 1 and 2 and the standard deviation of the non-GLI from the target grain aspect ratio range is defined to lie beyond 2.

4. The method as claimed in claim 3, wherein weight of the grain colored adulterants and the non-grain colored adulterants is obtained by mapping the aspect ratio to a corresponding weight from the aspect ratio to the predefined weight mapping tables.

5. A system for grain grading analysis, the system comprising:
a memory storing instructions;
one or more Input/Output (I/O) interfaces; and
one or more hardware processors coupled to the memory via the one or more I/O interfaces, wherein the one or more hardware processors are configured by the instructions to:
preprocess an image, received for the grain grading analysis for a grain type, to enhance image quality, wherein the image comprises a sample element mixture comprising a plurality of elements and a reference object, and wherein the preprocessing comprises iterating the image through an image enhancement process till the image satisfies a quality criteria;
process the preprocessed image by performing resizing, denoising, and Gaussian blurring to obtain a processed image;
determine a plurality of morphological features of the plurality of elements in the processed image by:
a) performing background elimination using image segmentation and inpainting operation, followed by contour detection on the processed image to obtain a contour plot of each of the plurality of elements and the reference object in the processed image;
b) determining i) a calibration factor in terms of pixel per metric for a length, a width and a height, and ii) an aspect ratio to predetermined weight mapping tables of a plurality of reference objects, a plurality of grain types and a plurality of varieties of the plurality of grain types; and
c) determining the plurality of morphological features of each of the plurality of elements using the contour plot and the calibration factor, wherein the morphological features comprise a perimeter, a width, a height, and an aspect ratio;
confirm whether the sample mixture is of the grain type by determining whether at least a predefined number of elements among the plurality of elements belong to the grain type, wherein the grain type is identified by binning each of the plurality of elements in accordance with the element aspect ratio into a plurality of bins and checking whether one or more elements associated with a bin, among the plurality of bins, satisfy a kernel aspect ratio range predefined for the grain type;
differentiate the plurality of elements, post confirming the sample element mixture is of the grain type, wherein the differentiation is based on a lower threshold and an upper threshold of an Inter Quartile Range (IQR) of a perimeter metric corresponding to the perimeter of each of the plurality of elements to segregate the plurality of elements as:
a) a first set of elements having lower size impurity in the sample element mixture,
b) a second set of elements having a target grain perimeter range identified for the grain type, and
c) a third set of elements having a higher size impurity; and
perform:
a) identification of a variety of the grain type, from among the plurality of varieties by binning the second set of elements into a plurality of bins based on the aspect ratio, wherein the aspect ratio associated with a max bin among the plurality of bins that has maximum number of elements from the second set of elements indicates the variety of the grain type being graded in accordance with a predefined aspect ratio to variety mapping; and
b) calculation of a total adulteration percentage for the variety based on number of elements in the max bin and number of elements in the first set of elements and the second set of elements.

6. The system of claim 5, wherein the one or more hardware processors are configured to differentiate the plurality of elements as grain colored elements and non-grain colored elements using an image color segmentation technique and labelling the non-grain colored elements as non-grain colored adulterants.

7. The system of claim 6, wherein the one or more hardware processors are further configured to:
identify grain-colored adulterants from the grain colored elements by filtering elements lying within the target grain perimeter range; and
segregate using a normal distribution approach based on a mean and a standard deviation of the grain colored adulterants into Grain Like Impurities (GLI) and non-GLI, wherein the standard deviation of the GLI from a target grain aspect ratio range is defined to lie between 1 and 2 and the standard deviation of the non-GLI from the target grain aspect ratio range is defined to lie beyond 2.

8. The system of claim 7, wherein the one or more hardware processors are configured to obtain weight of the grain colored adulterants and the non-grain colored adulterants by mapping the aspect ratio to a corresponding weight from the aspect ratio to the predefined weight mapping tables.

9. One or more non-transitory machine-readable information storage mediums comprising one or more instructions which when executed by one or more hardware processors cause:
preprocessing an image, received for the grain grading analysis for a grain type, to enhance image quality, wherein the image comprises a sample element mixture comprising a plurality of elements and a reference object, and wherein the preprocessing comprises iterating the image through an image enhancement process till the image satisfies a quality criteria;
processing the preprocessed image by performing resizing, denoising, and Gaussian blurring to obtain a processed image;
determining a plurality of morphological features of the plurality of elements in the processed image by:
  a) performing background elimination using image segmentation and inpainting operation, followed by contour detection on the processed image to obtain a contour plot of each of the plurality of elements and the reference object in the processed image;
  b) determining i) a calibration factor in terms of pixel per metric for a length, a width and a height, and ii) an aspect ratio to predetermined weight mapping tables of a plurality of reference objects, a plurality of grain types and a plurality of varieties of the plurality of grain types; and
  c) determining the plurality of morphological features of each of the plurality of elements using the contour plot and the calibration factor, wherein the morphological features comprise a perimeter, a width, a height, and an aspect ratio;
confirming whether the sample mixture is of the grain type by determining whether at least a predefined number of elements among the plurality of elements belong to the grain type, wherein the grain type is identified by binning each of the plurality of elements in accordance with the element aspect ratio into a plurality of bins and checking whether one or more elements associated with a bin, among the plurality of bins, satisfy a kernel aspect ratio range predefined for the grain type;
differentiating the plurality of elements, post confirming the sample element mixture is of the grain type, wherein the differentiation is based on a lower threshold and an upper threshold of an Inter Quartile Range (IQR) of a perimeter metric corresponding to the perimeter of each of the plurality of elements to segregate the plurality of elements as:
  a) a first set of elements having lower size impurity in the sample element mixture,
  b) a second set of elements having a target grain perimeter range identified for the grain type, and
  c) a third set of elements having a higher size impurity; and
performing:
  a) identification of a variety of the grain type, from among the plurality of varieties by binning the second set of elements into a plurality of bins based on the aspect ratio, wherein the aspect ratio associated with a max bin among the plurality of bins that has maximum number of elements from the second set of elements indicates the variety of the grain type being graded in accordance with a predefined aspect ratio to variety mapping; and
  b) calculation of a total adulteration percentage for the variety based on number of elements in the max bin and number of elements in the first set of elements and the second set of elements.

10. The one or more non-transitory machine-readable information storage mediums of claim 9, wherein the method further comprises differentiating the plurality of elements as grain colored elements and non-grain colored elements using an image color segmentation technique and labelling the non-grain colored elements as non-grain colored adulterants.

11. The one or more non-transitory machine-readable information storage mediums of claim 10, wherein the method further comprises:
identifying rain-colored adulterants from the grain colored elements by filtering elements lying within the target grain perimeter range; and
segregating using a normal distribution approach based on a mean and a standard deviation of the grain colored adulterants into Grain Like Impurities (GLI) and non-GLI, wherein the standard deviation of the GLI from a target grain aspect ratio range is defined to lie between 1 and 2 and the standard deviation of the non-GLI from the target grain aspect ratio range is defined to lie beyond 2.

12. The one or more non-transitory machine-readable information storage mediums of claim 11, wherein weight of the grain colored adulterants and the non-grain colored adulterants is obtained by mapping the aspect ratio to a corresponding weight from the aspect ratio to the predefined weight mapping tables.

* * * * *